United States Patent
Akula et al.

(10) Patent No.: US 10,397,886 B2
(45) Date of Patent: Aug. 27, 2019

(54) POWER RESERVATION FOR CARRIER AGGREGATION SIGNALING DURING SHORTENED TRANSMISSION TIME INTERVALS

(71) Applicant: QUALCOMM Incorporated, San Diego, CA (US)

(72) Inventors: Prashanth Akula, Lake Bluff, IL (US); Amir Farajidana, Sunnyvale, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/019,113

(22) Filed: Jun. 26, 2018

(65) Prior Publication Data
US 2019/0007910 A1 Jan. 3, 2019

Related U.S. Application Data

(60) Provisional application No. 62/526,650, filed on Jun. 29, 2017.

(51) Int. Cl.
*H04L 5/00* (2006.01)
*H04W 52/14* (2009.01)
(Continued)

(52) U.S. Cl.
CPC ............. *H04W 52/365* (2013.01); *H04L 5/00* (2013.01); *H04W 52/346* (2013.01);
(Continued)

(58) Field of Classification Search
CPC . H04W 52/146; H04W 52/34; H04W 52/367; H04W 52/365; H04W 52/346;
(Continued)

(56) References Cited

U.S. PATENT DOCUMENTS

| 2012/0082043 | A1* | 4/2012 | Hwang | H04L 5/001 370/252 |
| 2016/0255594 | A1* | 9/2016 | Vajapeyam | H04W 52/346 455/522 |
| 2016/0255676 | A1* | 9/2016 | Vajapeyam | H04W 16/14 370/329 |

FOREIGN PATENT DOCUMENTS

WO    WO-2016137816 A2    9/2016

OTHER PUBLICATIONS

3GPP Draft; R1-1710879 (R15 NR WI AI 5191 Power Sharing), 3RD Generation Partnership Project (3GPP), Mobile Competence Centre ; vol. RAN WG1, no. Qingdao, Jun. 26, 2017.*

(Continued)

*Primary Examiner* — Golam Sorowar
(74) *Attorney, Agent, or Firm* — Holland & Hart LLP

(57) ABSTRACT

Methods, systems, and devices for wireless communication are described. In some cases, a user equipment (UE) may be scheduled to transmit uplink signals on different carriers during transmission time intervals (TTIs) that have different durations. As such, a TTI on a first carrier (e.g., a reference carrier) may overlap with multiple shortened TTIs (sTTIs) on a second carrier (e.g., a non-reference carrier). Using the techniques described herein, the UE may select a calibration point (or a gain index) for uplink transmissions at the beginning of the TTI on the reference carrier based on an amount of power reserved for expected power increases during the TTI. As such, when the UE has to update its transmit power for an uplink transmission during an sTTI on the second carrier, the UE may apply a digital back-off from a power associated with the calibration point.

52 Claims, 16 Drawing Sheets

(51) Int. Cl.
*H04W 52/34* (2009.01)
*H04W 52/36* (2009.01)
*H04W 52/52* (2009.01)
*H04W 72/04* (2009.01)

(52) U.S. Cl.
CPC ......... *H04W 52/367* (2013.01); *H04W 52/52* (2013.01); *H04W 72/044* (2013.01); *H04W 52/146* (2013.01)

(58) Field of Classification Search
CPC ........... H04W 72/0473; H04W 72/042; H04W 52/325; H04W 72/0413; H04W 52/281; H04W 72/0446; H04W 52/16; H04W 24/10; H04W 52/40; H04W 52/243; H04W 72/04; H04W 52/58; H04W 52/242; H04W 52/38; H04W 56/0045; H04L 5/001; H04L 5/0053; H04L 5/0055; H04L 5/14; H04L 5/1469; H04L 5/0094; H04L 5/0007; H04L 5/0091; H04L 1/1861; H04L 5/0092; H04L 5/0035; H04L 1/0031; H04L 1/1607
See application file for complete search history.

(56) References Cited

OTHER PUBLICATIONS

Interdigital Inc: "Power Sharing Mechanisms with LTE-NR DC and NR DC", 3GPP Draft; R1-1710879 (R15 NR WI AI 5191 Power Sharing), 3rd Generation Partnership Project (3GPP), Mobile Competence Centre; 650, Route Des Lucioles; F-06921 Sophia-Antipolis Cedex; France, vol. Ran WG1, no. Qingdao, P.R. China; 20170627-20170630 Jun. 26, 2017 (Jun. 26, 2017), pp. 1-7, XP051300081, Retrieved from the Internet: URL: http://www.3gpp.org/ftp/Meetings_3GPP_SYNC/RAN1/Docs/ [retrieved on Jun. 26, 2017].
International Search Report and Written Opinion—PCT/US2018/039676—ISA/EPO—Sep. 26, 2018 (174779WO).

* cited by examiner

POWER RESERVATION FOR CARRIER AGGREGATION SIGNALING DURING SHORTENED TRANSMISSION TIME INTERVALS

CROSS REFERENCES

The present Application for patent claims the benefit of U.S. Provisional Patent Application No. 62/526,650 by Akula et al., entitled "Power Reservation For Carrier Aggregation Signaling During Shortened Transmission Time Intervals," filed Jun. 29, 2017, assigned to the assignee hereof, and expressly incorporated by reference herein in its entirety.

BACKGROUND

The following relates generally to wireless communication and more specifically to power reservation for carrier aggregation signaling during shortened transmission time intervals (sTTIs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or access network nodes, each simultaneously supporting communication for multiple communication devices, which may be otherwise known as user equipment (UE). Some wireless communications systems may support communication between a UE and a base station on multiple aggregated carriers, a feature referred to as carrier aggregation. In some examples, a UE may transmit uplink signals on different carriers during transmission time intervals (TTIs) having different durations. For instance, the UE may transmit during a first TTI on a first carrier and during a second TTI that is shorter than the first TTI on a second carrier (e.g., an sTTI). In such examples, the first TTI on the first carrier may overlap with multiple TTIs (e.g., sTTIs) on the second carrier. Conventional techniques for transmitting during overlapping TTIs on multiple carriers may be deficient.

SUMMARY

Some wireless communications systems may support communication between a user equipment (UE) and a base station on multiple aggregated component carriers (CC) (i.e., carrier aggregation (CA)). In some cases, the UE may be scheduled to transmit uplink signals on different carriers during transmission time intervals (TTIs) that have different durations. As such, a TTI on a first carrier may overlap with multiple shortened TTIs (sTTIs) on a second carrier. In such cases, because the transmissions in each of the sTTIs may be independent, the UE may use a different transmit power for the uplink transmissions in each of the sTTIs, which may cause a transient effect (e.g., power and/or phase transient effect) on a transmission during the TTI on the first carrier.

In order to limit the transient effects on uplink transmissions on the first carrier, the UE may use the techniques described herein to efficiently select a calibration point associated with a calibrated power at the beginning of a TTI on the first carrier. Specifically, the UE may determine an amount of power to reserve for expected increases in transmit power during the TTI at the boundary of the TTI, and the UE may select an initial calibration point for transmissions during the TTI based in part on the amount of power reserved. As such, when the UE has to increase its transmit power for an uplink transmission during an sTTI on the second carrier that overlaps with the TTI on the first carrier, the UE may apply a digital back-off from a calibrated power associated with the calibration point to achieve the desired transmit power.

A method for wireless communication at a UE is described. The method may include identifying, from a plurality of component carriers used in carrier aggregation communication, a first component carrier having a first TTI duration as a reference component carrier and a second component carrier having a second TTI duration different from the first TTI duration, determining, at a first TTI boundary of a first TTI of the reference component carrier, a first transmit power for the reference component carrier and a second transmit power for a second component carrier of the plurality of component carriers, determining an amount of transmit power to be reserved during the first TTI for adjusting the second transmit power at second TTI boundaries of the second component carrier, and transmitting, during the first TTI, at the first transmit power for the reference component carrier and at the second transmit power for the second component carrier, based at least in part on the amount of transmit power reserved.

An apparatus for wireless communication at a UE is described. The apparatus may include means for identifying, from a plurality of component carriers used in carrier aggregation communication, a first component carrier having a first TTI duration as a reference component carrier and a second component carrier having a second TTI duration different from the first TTI duration, means for determining, at a first TTI boundary of a first TTI of the reference component carrier, a first transmit power for the reference component carrier and a second transmit power for a second component carrier of the plurality of component carriers, means for determining an amount of transmit power to be reserved during the first TTI for adjusting the second transmit power at second TTI boundaries of the second component carrier, and means for transmitting, during the first TTI, at the first transmit power for the reference component carrier and at the second transmit power for the second component carrier, based at least in part on the amount of transmit power reserved.

Another apparatus for wireless communication at a UE is described. The apparatus may include a processor, memory in electronic communication with the processor, and instructions stored in the memory. The instructions may be operable to cause the processor to identify, from a plurality of component carriers used in carrier aggregation communication, a first component carrier having a first TTI duration as a reference component carrier and a second component carrier having a second TTI duration different from the first TTI duration, determine, at a first TTI boundary of a first TTI of the reference component carrier, a first transmit power for the reference component carrier and a second transmit power for a second component carrier of the plurality of component carriers, determine an amount of transmit power to be reserved during the first TTI for adjusting the second transmit power at second TTI boundaries of the second component carrier, and transmit, during the first TTI, at the first transmit power for the reference component carrier and at the second transmit power for the second component carrier, based at least in part on the amount of transmit power reserved.

A non-transitory computer readable medium for wireless communication at a UE is described. The non-transitory computer-readable medium may include instructions operable to cause a processor to identify, from a plurality of component carriers used in carrier aggregation communication, a first component carrier having a first TTI duration as a reference component carrier and a second component carrier having a second TTI duration different from the first TTI duration, determine, at a first TTI boundary of a first TTI of the reference component carrier, a first transmit power for the reference component carrier and a second transmit power for a second component carrier of the plurality of component carriers, determine an amount of transmit power to be reserved during the first TTI for adjusting the second transmit power at second TTI boundaries of the second component carrier, and transmit, during the first TTI, at the first transmit power for the reference component carrier and at the second transmit power for the second component carrier, based at least in part on the amount of transmit power reserved.

In some examples of the method, apparatus, and non-transitory computer-readable medium described above, determining the amount of transmit power to be reserved during the first TTI includes receiving, from a base station, an indication of the amount of transmit power to be reserved during the first TTI. In some examples of the method, apparatus, and non-transitory computer-readable medium described above, determining the amount of transmit power to be reserved during the first TTI includes autonomously determining the amount of transmit power to reserve during the first TTI. Some examples of the method, apparatus, and non-transitory computer-readable medium described above may further include processes, features, means, or instructions for transmitting, to a base station, an indication of the amount of transmit power reserved during the first TTI.

In some examples of the method, apparatus, and non-transitory computer-readable medium described above, the indication may be transmitted in a power headroom (PHR) report. Some examples of the method, apparatus, and non-transitory computer-readable medium described above may further include processes, features, means, or instructions for selecting a power amplifier (PA) gain value for a calibration point based at least in part on the amount of transmit power reserved during the first TTI, the first transmit power, and the second transmit power, where the transmitting includes digitally backing off from a transmit power corresponding to the PA gain value for the calibration point.

Some examples of the method, apparatus, and non-transitory computer-readable medium described above may further include processes, features, means, or instructions for identifying an updated second transmit power for the second component carrier during a duration of the first TTI and at a second TTI boundary of a second TTI on the second component carrier, the second TTI boundary being unaligned with the first TTI boundary. Some examples of the method, apparatus, and non-transitory computer-readable medium described above may further include processes, features, means, or instructions for maintaining the PA gain value for the calibration point while transmitting during the first TTI at the first transmit power for the reference component carrier and at the updated second transmit power for the second component carrier. In some examples of the method, apparatus, and non-transitory computer-readable medium described above, maintaining the PA gain value for the calibration point includes adjusting an amount of digital back-off from the transmit power corresponding to the PA gain value for the calibration point.

Some examples of the method, apparatus, and non-transitory computer-readable medium described above may further include processes, features, means, or instructions for identifying an updated second transmit power for the second component carrier during a duration of the first TTI and at a second TTI boundary of a second TTI on the second component carrier, the second TTI boundary being unaligned with the first TTI boundary. Some examples of the method, apparatus, and non-transitory computer-readable medium described above may further include processes, features, means, or instructions for identifying that a sum of the first transmit power and the updated second transmit power exceeds the transmit power corresponding to the PA gain value for the calibration point.

Some examples of the method, apparatus, and non-transitory computer-readable medium described above may further include processes, features, means, or instructions for identifying a transient period for a PA gain adjustment. Some examples of the method, apparatus, and non-transitory computer-readable medium described above may further include processes, features, means, or instructions for updating the PA gain value for a different calibration point during the transient period based at least in part on the first transmit power and the updated second transmit power. Some examples of the method, apparatus, and non-transitory computer-readable medium described above may further include processes, features, means, or instructions for transmitting, during the first TTI of the reference component carrier and during the second TTI of the second component carrier, at the first transmit power for the reference component carrier and at the updated second transmit power for the second component carrier.

In some examples of the method, apparatus, and non-transitory computer-readable medium described above, the second TTI includes any one of one or more TTIs of the second component carrier that overlap with the first TTI of the first component carrier. In some examples of the method, apparatus, and non-transitory computer-readable medium described above, the PA gain value for the calibration point may be selected based at least in part on a sum of the amount of transmit power reserved during the first TTI, the first transmit power, and the second transmit power. In some examples of the method, apparatus, and non-transitory computer-readable medium described above, the transmit power corresponding to the PA gain value for the calibration point may be equal to or greater than the sum of the amount of transmit power reserved during the first TTI, the first transmit power, and the second transmit power.

In some examples of the method, apparatus, and non-transitory computer-readable medium described above, the amount of transmit power reserved during the first TTI may be based at least in part on expected transmit power increases on the second component carrier during the first TTI of the reference component carrier. Some examples of the method, apparatus, and non-transitory computer-readable medium described above may further include processes, features, means, or instructions for transmitting an indication of an actual amount of power reserved for the expected transmit power increases on the second component carrier during the first TTI of the reference component carrier.

In some examples of the method, apparatus, and non-transitory computer-readable medium described above, identifying the reference component carrier may be based at least in part on the first TTI duration being longer than the second TTI duration. In some examples of the method, apparatus, and non-transitory computer-readable medium described above, the reference component carrier and the second component carrier may be within a same frequency band. In some examples of the method, apparatus, and non-transitory computer-readable medium described above, a same PA may be used by the UE for transmissions on the reference component carrier and the second component carrier.

In some examples of the method, apparatus, and non-transitory computer-readable medium described above, the amount of transmit power reserved may be equal to a PHR associated with transmissions on the reference component carrier and the second component carrier during the first TTI. In some examples of the method, apparatus, and non-transitory computer-readable medium described above, the amount of transmit power reserved may be less than a PHR associated with transmissions on the reference component carrier and the second component carrier during the first TTI.

A method for wireless communication at a base station is described. The method may include identifying, from a plurality of component carriers used in carrier aggregation communication, a first component carrier as a reference component carrier, transmitting, to a UE, a first indication of a first transmit power for transmissions on the reference component carrier during a first TTI and a second transmit power for transmissions on a second component carrier of the plurality of component carriers during a second TTI that at least partially overlaps with the first TTI, identifying a reserved amount of transmit power based at least in part on expected transmit power increases on the second component carrier during the first TTI of the reference component carrier, and transmitting, to the UE, a reserved power indication indicating the reserved amount of transmit power to be used by the UE in selecting a PA gain value for a calibration point.

An apparatus for wireless communication at a base station is described. The apparatus may include means for identifying, from a plurality of component carriers used in carrier aggregation communication, a first component carrier as a reference component carrier, means for transmitting, to a UE, a first indication of a first transmit power for transmissions on the reference component carrier during a first TTI and a second transmit power for transmissions on a second component carrier of the plurality of component carriers during a second TTI that at least partially overlaps with the first TTI, means for identifying a reserved amount of transmit power based at least in part on expected transmit power increases on the second component carrier during the first TTI of the reference component carrier, and means for transmitting, to the UE, a reserved power indication indicating the reserved amount of transmit power to be used by the UE in selecting a PA gain value for a calibration point.

Another apparatus for wireless communication at a base station is described. The apparatus may include a processor, memory in electronic communication with the processor, and instructions stored in the memory. The instructions may be operable to cause the processor to identify, from a plurality of component carriers used in carrier aggregation communication, a first component carrier as a reference component carrier, transmit, to a UE, a first indication of a first transmit power for transmissions on the reference component carrier during a first TTI and a second transmit power for transmissions on a second component carrier of the plurality of component carriers during a second TTI that at least partially overlaps with the first TTI, identify a reserved amount of transmit power based at least in part on expected transmit power increases on the second component carrier during the first TTI of the reference component carrier, and transmit, to the UE, a reserved power indication indicating the reserved amount of transmit power to be used by the UE in selecting a PA gain value for a calibration point.

A non-transitory computer readable medium for wireless communication at a base station is described. The non-transitory computer-readable medium may include instructions operable to cause a processor to identify, from a plurality of component carriers used in carrier aggregation communication, a first component carrier as a reference component carrier, transmit, to a UE, a first indication of a first transmit power for transmissions on the reference component carrier during a first TTI and a second transmit power for transmissions on a second component carrier of the plurality of component carriers during a second TTI that at least partially overlaps with the first TTI, identify a reserved amount of transmit power based at least in part on expected transmit power increases on the second component carrier during the first TTI of the reference component carrier, and transmit, to the UE, a reserved power indication indicating the reserved amount of transmit power to be used by the UE in selecting a PA gain value for a calibration point.

Some examples of the method, apparatus, and non-transitory computer-readable medium described above may further include processes, features, means, or instructions for receiving, from the UE, a PA power indication indicating an actual amount of power reserved for the expected transmit power increases on the second component carrier during the first TTI of the reference component carrier. Some examples of the method, apparatus, and non-transitory computer-readable medium described above may further include processes, features, means, or instructions for determining an updated reserved amount of transmit power for a subsequent TTI on the reference component carrier based at least in part on receiving the PA power indication.

Some examples of the method, apparatus, and non-transitory computer-readable medium described above may further include processes, features, means, or instructions for identifying an updated second transmit power used for transmissions on the second component carrier during a third TTI that at least partially overlaps with the first TTI, determining that a sum of the first transmit power and the updated second transmit power exceeds a transmit power corresponding to the PA gain value for the calibration point, identifying a break in phase continuity of the transmissions on the reference component carrier during the first TTI based at least in part on the determination, and demodulating the transmissions on the reference component carrier during the first TTI based at least in part on identifying the break in phase continuity.

In some examples of the method, apparatus, and non-transitory computer-readable medium described above, identifying the reference component carrier may be based at least in part on the first TTI of the reference component carrier having a longer duration than a duration of the second TTI of the second component carrier. In some examples of the method, apparatus, and non-transitory computer-readable medium described above, the reference component carrier and the second component carrier may be within a same frequency band.

In some examples of the method, apparatus, and non-transitory computer-readable medium described above, the reserved amount of transmit power may be equal to a PHR associated with transmissions on the reference component carrier and the second component carrier during the first TTI. In some examples of the method, apparatus, and non-transitory computer-readable medium described above, the reserved amount of transmit power may be less than a PHR associated with transmissions on the reference component carrier and the second component carrier during the first TTI.

DETAILED DESCRIPTION

Figure 1:
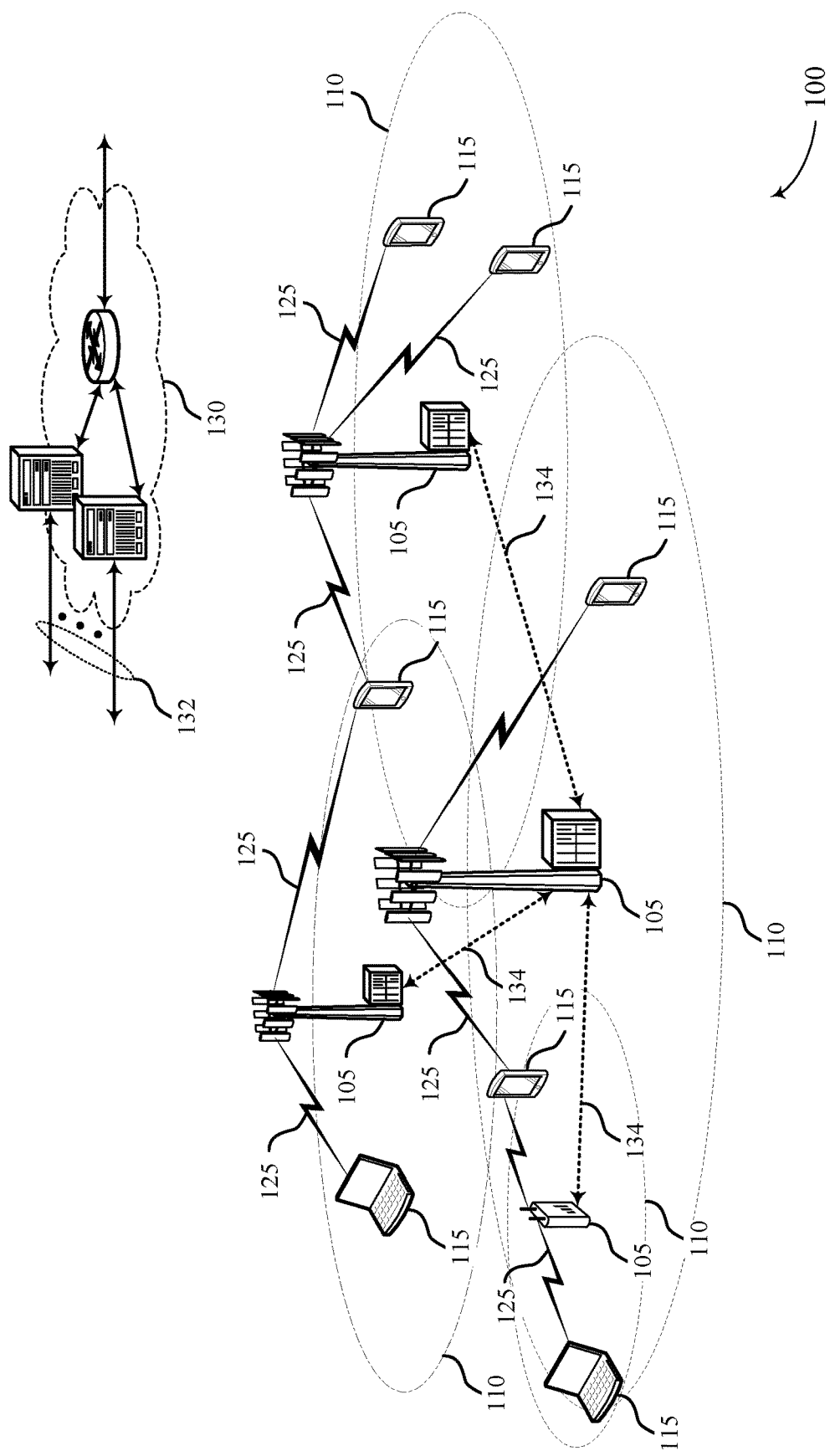
FIGS. 1 and 2 illustrate examples of wireless communications systems that support power reservation for carrier aggregation signaling during shortened transmission time intervals (sTTIs) in accordance with various aspects of the present disclosure.

Some wireless communications systems may support communication between a user equipment (UE) and a base station on multiple aggregated component carriers (CCs), a feature referred to as carrier aggregation. In some cases, a wireless communications system may support different types of carrier aggregation. For example, a wireless communications system may support inter-band carrier aggregation, where a base station may communicate with a UE on multiple carriers that belong to different frequency bands. And the wireless communications system may support intra-band carrier aggregation, where a base station may communicate with a UE on multiple carriers that belong to the same frequency band.

In some cases (e.g., for inter-band carrier aggregation), a UE may be configured to use different power amplifiers (PAs) for uplink transmissions to a base station on different carriers. In such cases, a change to the power used for uplink transmissions on one carrier may not affect uplink transmissions on another carrier. In other cases (e.g., for intra-band carrier aggregation), however, the UE may be configured to use the same PA for uplink transmissions to a base station on different carriers. In such cases, a change to the power used for uplink transmissions on one carrier may cause a transient effect on uplink transmissions on another carrier, which may disrupt the transmissions on the other carrier.

In order to avoid such transient effects, a wireless communications system may schedule a transient period during which a UE may adjust its transmit power for an uplink transmission. That is, the UE may refrain from transmitting during the transient period, and the UE may use this time to adjust its transmit power. In some examples, the UE may identify an updated gain index or calibration point associated with a calibrated power that is equal to the desired transmit power or greater than the desired transmit power (i.e., the closest calibration point with a calibrated power that is greater than the desired transmit power), and the UE may adjust its transmit power to the desired transmit power by applying a digital back-off from the calibrated power.

In some examples, however, the use of a transient period for allowing a UE to adjust its transmit power may reduce throughput significantly. As an example, for intra-band carrier aggregation, a UE may transmit signals during TTIs having one duration on a first carrier and during TTIs having a different duration on a second carrier. Thus, a TTI used for communications on the first carrier may overlap with multiple TTIs (e.g., shortened TTIs (sTTIs)) used for communications on the second carrier. In such cases, if the UE is configured to use a transient period to adjust its transmit power for uplink transmissions in each of the sTTIs in the second carrier, the UE may have to refrain from transmitting uplink signals on the first carrier during the transient periods, which may result in reduced throughput in a wireless communications system.

As described herein, a wireless communications system may support techniques for configuring a UE to adjust its transmit power efficiently during a TTI used for uplink transmissions on one carrier that overlaps with sTTIs used for uplink transmissions on another carrier. Specifically, the UE may be configured to reserve a certain amount of power for expected transmit power increases during the TTI, and the UE may select a gain index or a calibration point for uplink transmissions during the TTI at the beginning of the TTI based in part on the amount of power reserved. In some examples, the UE may sum a first transmit power to be used for uplink transmissions on the first carrier, a second transmit power to be used for uplink transmissions on the second carrier, and the power reserved for expected transmit power increases during the TTI, and the UE may select a gain index or calibration point associated with a calibrated power for the uplink transmission based on the sum. The UE may then be able to transmit using a desired transmit power by digitally backing off from the calibrated power.

Aspects of the disclosure introduced above are described below in the context of a wireless communications system. Examples of processes and signaling exchanges that support power reservation for carrier aggregation signaling during sTTIs are then described. Aspects of the disclosure are further illustrated by and described with reference to apparatus diagrams, system diagrams, and flowcharts that relate to power reservation for carrier aggregation signaling during sTTIs.

FIG. 1 illustrates an example of a wireless communications system 100 that supports power reservation for carrier aggregation signaling during sTTIs in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced mobile broadband (eMBB) communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions from a base station 105 to a UE 115. Control information and data may be multiplexed on an uplink channel or downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

Time intervals in LTE or NR may be expressed in multiples of a basic time unit (which may be a sampling period of $T_s=1/30{,}720{,}000$ seconds). Time resources may be organized according to radio frames of length of 10 ms ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods.

In wireless communications system 100, a TTI may be defined as the smallest unit of time in which a base station 105 may schedule a UE 115 for uplink or downlink transmissions. As an example, a base station 105 may allocate one or more TTIs for downlink communication with a UE 115. The UE 115 may then monitor the one or more TTIs to receive downlink signals from the base station 105. In some wireless communications systems (e.g., LTE), a subframe may be the basic unit of scheduling or TTI. In other cases, such as with low latency operation, a different, reduced-duration TTI (e.g., an sTTI) may be used (e.g., a mini-slot). Wireless communications system 100 may employ various TTI durations, including those that facilitate ultra-reliable low-latency communications (URLLC) and mobile broadband (MBB) communications, in addition to other types of communication associated with LTE and NR.

A resource element may consist of one symbol period and one subcarrier (e.g., a 15 KHz frequency range). In some cases, the numerology employed within a system (i.e., subcarrier size, symbol-period duration, or TTI duration) may be selected or determined based on a type of communication. The numerology may be selected or determined in view of an inherent tradeoff between latency for low latency applications and efficiency for other applications, for example. In some cases, the duration of time slots allocated for MBB communications may be greater than the duration of time slots allocated for URLLC. Time slots allocated for URLLC may be referred to as mini-slots.

Wireless communications system 100 may support operation on multiple cells or carriers, a feature which may be referred to as carrier aggregation or multi-carrier operation. A carrier may also be referred to as a component carrier, a layer, a channel, etc. The terms "carrier," "component carrier," "cell," and "channel" may be used interchangeably herein. A UE 115 may be configured with multiple downlink component carriers and one or more uplink component carriers for carrier aggregation. In some cases, wireless communications system 100 may utilize enhanced component carriers (eCCs).

An enhanced component carrier may be characterized by one or more features including: wider bandwidth, shorter symbol duration, shorter TTIs, and modified control channel configuration. In some cases, an enhanced component carrier may be associated with a carrier aggregation configuration or a dual connectivity configuration (e.g., when multiple serving cells have a suboptimal or non-ideal backhaul link). An enhanced component carrier characterized by wide bandwidth may include one or more segments that may be utilized by UEs 115 that are not capable of monitoring the whole bandwidth or prefer to use a limited bandwidth (e.g., to conserve power).

In some cases, an enhanced component carrier may utilize a different symbol duration than other component carriers, which may include use of a reduced symbol duration as compared with symbol durations of other component carriers. A shorter symbol duration is associated with increased subcarrier spacing. A device, such as a UE 115 or base station 105, communicating on enhanced component carriers may transmit wideband signals (e.g., 20, 40, 60, 80 MHz, etc.) at reduced symbol durations (e.g., 16.67 microseconds). A duration of a TTI used for communication on an enhanced component carrier may be variable, and the TTI may consist of one or multiple symbols.

In wireless communications system 100, a UE 115 may simultaneously communicate on multiple carriers during TTIs having different durations. In some cases, a TTI on one carrier may overlap with multiple TTIs (e.g., sTTIs) on another carrier, and the UE 115 may use different transmit powers for uplink transmissions in each of the sTTIs. In such cases, the UE 115 may be configured to use a transient period to adjust its transmit power for transmitting in each sTTI, and the UE may refrain from transmitting uplink signals during the transient period. However, the use of a transient period may cause reduced throughput since the UE 115 may not be able to transmit during this period. Wireless communications system 100 may support techniques for configuring a UE 115 to efficiently adjust its transmit power across sTTIs with the use of limited (or no) transient periods.

Figure 2:
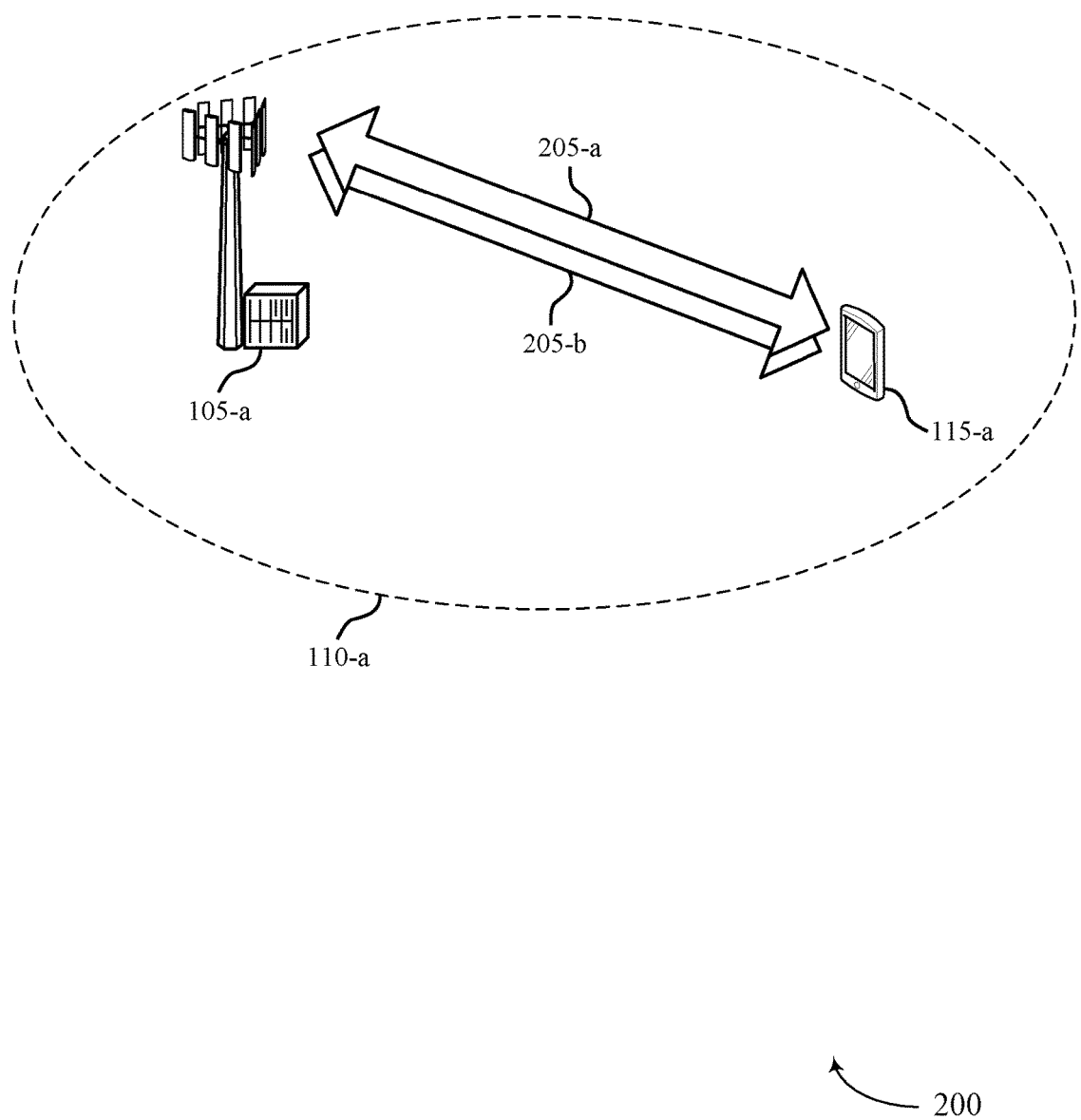

FIG. 2 illustrates an example of a wireless communications system 200 that supports power reservation for carrier aggregation signaling during sTTIs in accordance with various aspects of the present disclosure. Wireless communications system 200 may include base station 105-a and UE 115-a, which may be examples of a base station 105 and a UE 115 described with reference to FIG. 1. Base station 105-a may be in communication with one or more UEs 115 (e.g., UE 115-a) within geographic coverage area 110-a. Wireless communications system 200 may implement aspects of wireless communications system 100. For example, wireless communications system 200 may support carrier aggregation, and base station 105-a may communicate with UE 115-a on resources of multiple carriers 205. The duration of the TTIs used for communication on carriers 205-a and 205-b may be different.

Figure 3:
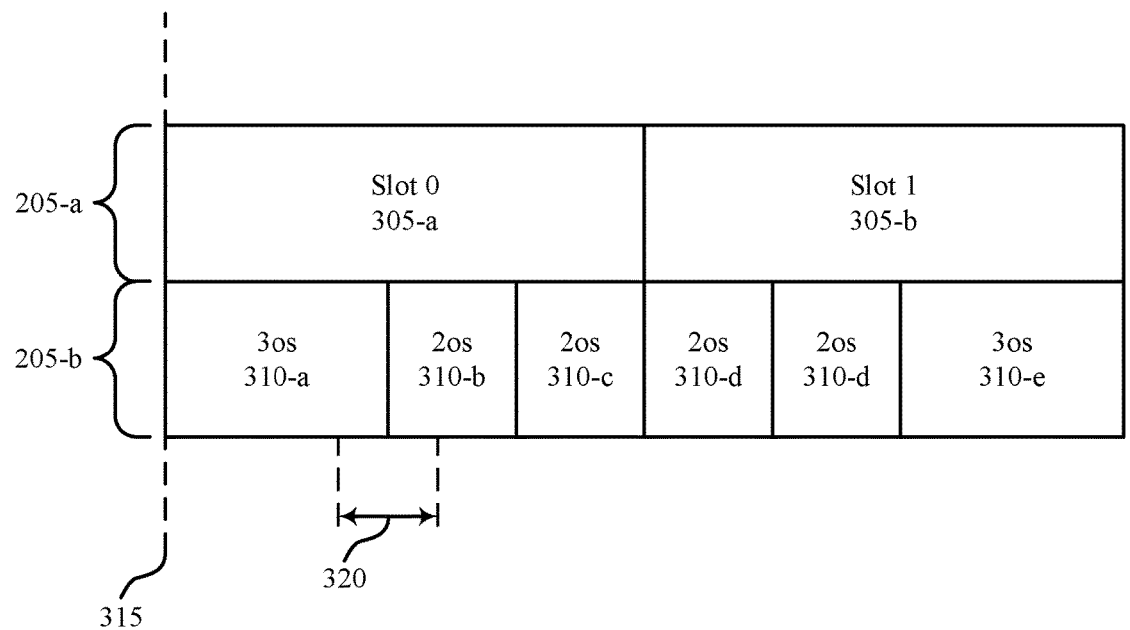
FIG. 3 illustrates an example of transmission time intervals (TTIs) and sTTIs used for carrier aggregation signaling in accordance with various aspects of the present disclosure.

FIG. 3 illustrates an example of TTIs and sTTIs 300 used for communication on carriers 205 in accordance with various aspects of the present disclosure. In the example of FIG. 3, the TTIs used for communication on a first carrier 205-a are of a different length than the TTIs used for communication on a second carrier 205-b. For example, the TTIs used for communication on the first carrier 205-a may have a duration of one millisecond (e.g., a subframe) or may span seven orthogonal frequency division multiplexing (OFDM) symbols (i.e., 7os or a slot), and the TTIs used for communication on the second carrier 205-b may span two or three OFDM symbols (i.e., 2os or 3os).

In some cases, UE 115-a may identify information (e.g., data or control information) to transmit during a first TTI 305-a on a first carrier 205-a and during a first sTTI 310-a on the second carrier 205-b. In such cases, the UE 115-a may also identify a first transmit power for the transmission during the first TTI 305-a and a second transmit power for the transmission during the first sTTI 310-a. Thus, the desired transmit power for the transmissions during the first TTI 305-a and the first sTTI 310-a may be the sum of the first transmit power and the second transmit power, and, in order to transmit using the desired transmit power, the UE 115-a may adjust its transmit power using an automatic gain control (AGC) process.

The AGC process may include updating transceiver and PA settings at the UE 115-a based on the desired transmit power such that the UE 115-a may transmit using the desired transmit power. Specifically, a PA at the UE 115-a may be calibrated with a certain set of transceiver and PA settings corresponding to various gain indices, and the PA may select a calibration point to use for a transmission based on the desired transmit power for the transmission. In some examples, the PA may select a calibration point that corresponds to a calibrated power that is equal to the desired transmit power or greater than and closest to the desired transmit power. The UE may then transmit using the desired transmit power by digitally backing off from the calibrated power (if necessary). In some cases, the digital back-off may be applied in one direction, and the power may not be increased from a calibration point using digital scaling.

Once the PA at the UE 115-a is configured to transmit using the desired transmit power, the UE 115-a may transmit during the first TTI 305-a on the first carrier 205-a using the first transmit power and during the first sTTI 310-a on the second carrier 205-b using the second transmit power. While transmitting during the first TTI 305-a on the first carrier 205-a, the UE 115-a may identify different information to transmit in a subsequent sTTI 310-b on the second carrier 205-b that overlaps with the first TTI 305-a (as shown). In some examples, though, the transmit power to be used for the transmission in the subsequent sTTI 310-b may be different from the transmit power used for the transmission in the previous sTTI 310-a.

If the transmit power to be used for the transmission in the subsequent sTTI 310-b is less than the calibrated power determined for sTTI 310-a, the UE 115-a may adjust the digital back-off to transmit using the new desired transmit power. However, if the transmit power to be used for the transmission in the sTTI 310-b is greater than the calibrated power, the UE 115-a may perform the AGC procedure described above to identify an updated calibrated point. For example, the PA at the UE 115-a may switch calibrated points to adjust an average power tracking (APT) voltage to be used for the transmission. In such cases, the power adjustment may cause a transient effect on the transmission in the first TTI 305-a of the first carrier 205-a.

To prevent the transient effect on the uplink transmission in the first TTI 305-a, base station 105-a may schedule a transient period during which the UE 115-a may suspend uplink transmissions (i.e., refrain from transmitting uplink signals) and adjust its transmit power. In some wireless communications systems (e.g., LTE systems), the UE may adjust its transmit power (and/or phase) at slot boundaries in a one millisecond TTI, and the transient period may span 20 µs in one slot and another 20 µs in the subsequent slot. However, in wireless communications system 200, UE 115-a may be scheduled to communicate during sTTIs 310, and, since the duration of an sTTI may be significantly shorter than other TTIs, the UE 115-a may have to adjust its transmit power more frequently. In such cases, if the UE 115-a uses a transient period to adjust its power across sTTIs, the UE 115-*a* may have to suspend uplink transmissions frequently and throughput may be significantly reduced in the system.

As described herein, UE 115-*a* may support efficient techniques for adjusting its transmit power for uplink transmissions on carriers 205. In some aspects, a PA at the UE 115-*a* may be calibrated with the same set of transceiver and PA settings described previously. However, using the techniques described herein, the UE 115-*a* may select a calibration point at the beginning of the first TTI 305-*a* (i.e., at slot boundary 315) based on the desired transmit power and an amount of power reserved for expected increases in transmit power during TTI 305-*a*. By selecting the calibration point based on the desired transmit power and an additional amount of power reserved for expected increases in transmit power, the UE 115-*a* may be able to adjust its transmit power in subsequent sTTIs 310 by adjusting a digital back-off from the calibrated power associated with the calibration point rather than selecting a different calibrated point. Accordingly, UE 115-*a* may avoid using a transient period to adjust its transmit power, which may improve throughput in wireless communications system 200.

Figure 4:
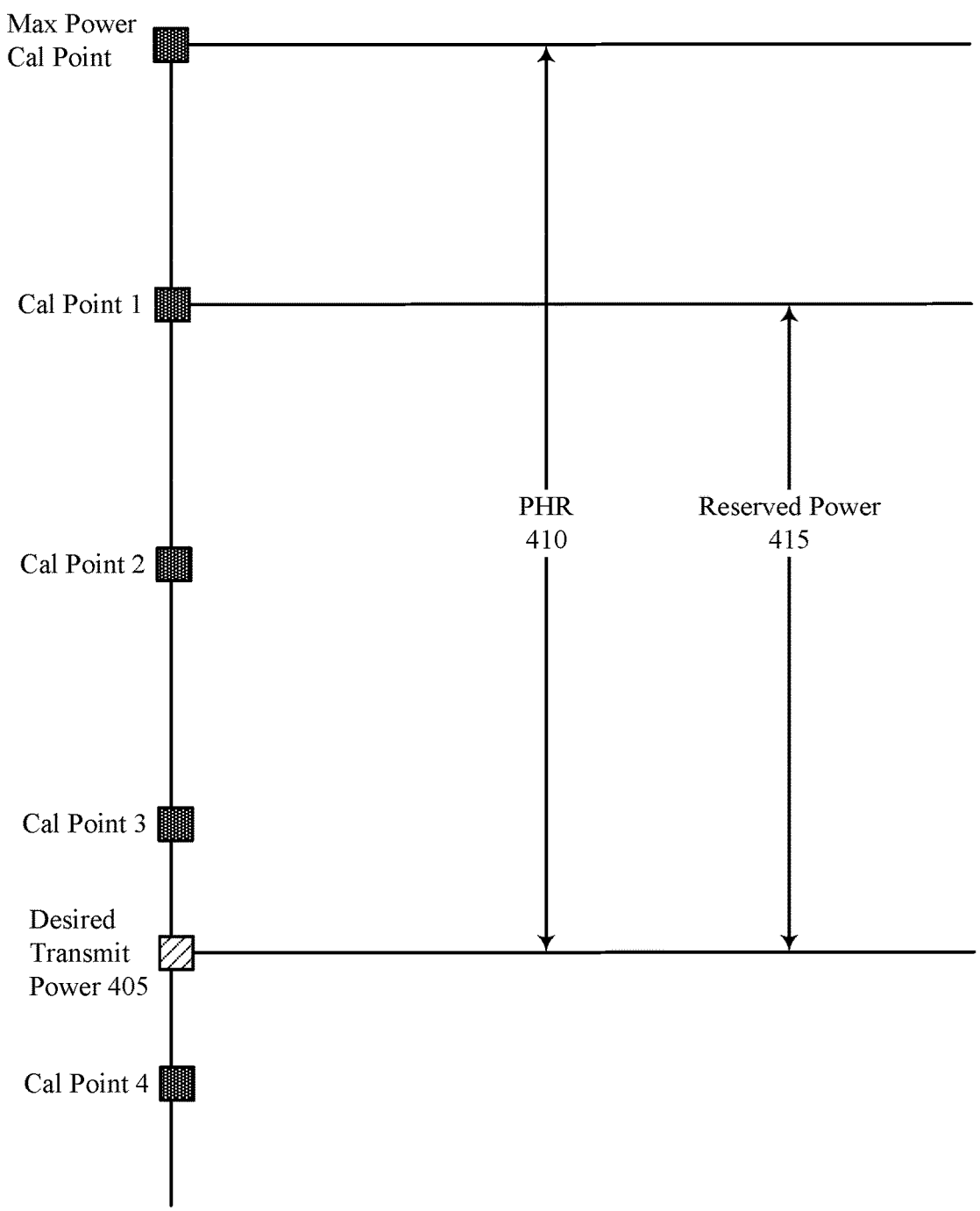
FIG. 4 illustrates an example diagram of calibration points associated with a power amplifier (PA) at a user equipment (UE) in accordance with various aspects of the present disclosure.

FIG. 4 illustrates an example diagram 400 of calibration points associated with a PA at UE 115-*a* in accordance with various aspects of the present disclosure. As described above, UE 115-*a* may identify a desired transmit power 405 for uplink transmissions in a first TTI 305-*a* and a first sTTI 310-*a*. Using the techniques described herein, the UE 115-*a* may select a calibration point at (or prior to) slot boundary 315 for the uplink transmission in the first TTI 305-*a* and the first sTTI 310-*a* based on the desired transmit power 405 and an amount of power reserved for expected increases in transmit power during the first TTI 305-*a* (i.e., reserved power 415). In some cases, the reserved power 415 may be equal to a power headroom (PHR) 410 associated with transmissions during the first TTI 305-*a* (e.g., when power is limited), or (as shown) the reserved power 415 may be less than the PHR 410 associated with transmissions during the first TTI 305-*a* (e.g., when power is not limited).

In the present example, UE 115-*a* may select calibration point 1 for uplink transmissions in the first TTI 305-*a* (e.g., rather than calibration point 3). UE 115-*a* may then transmit during the first TTI 305-*a* and the first sTTI 310-*a* using the desired transmit power 405 by applying a digital back-off from a calibrated power associated with calibration point 1. After transmitting during the first sTTI 310-*a*, UE 115-*a* may identify a different transmit power to use for an uplink transmission in a subsequent sTTI 310-*b*. In some examples, the transmit power to be used for the uplink transmission in sTTI 310-*b* may be greater than the transmit power used for the uplink transmission in the first sTTI 305-*a* and less than the calibrated power associated with calibration point 1. In such examples, UE 115-*a* may adjust a digital back-off to transmit using the updated desired transmit power in sTTI 310-*b* (i.e., the sum of the first transmit power used for uplink transmissions in TTI 305-*a* and an updated second transmit power to be used for uplink transmissions in sTTI 310-*b*).

In other examples, however, the transmit power to be used for the uplink transmission in sTTI 310-*b* (i.e., the sum of the first transmit power used for uplink transmissions in TTI 305-*a* and an updated second transmit power to be used for uplink transmissions in sTTI 310-*b*) may be greater than the transmit power used for the uplink transmission in the first sTTI 310-*a* and greater than the calibrated power associated with calibration point 1. In such examples, a base station may allocate a transient period 320 to UE 115-*a*, and UE 115-*a* may select an updated calibration point and adjust its transceiver and PA settings during the transient period 320. The transient period may be allocated for the first TTI 305-*a* on the reference carrier 205-*a* (i.e., the reference TTI), such that the transmission during the first TTI 305-*a* may not be disrupted by the process of adjusting the transceiver and PA settings. UE 115-*a* may then transmit the uplink transmission during sTTI 310-*b* by applying a digital back-off from a transmit power associated with the updated calibration point.

Base station 105-*a* may determine that the sum of the transmit power to be used for the uplink transmission in TTI 305-*a* and the transmit power to be used for the uplink transmission in sTTI 310-*b* exceeds the power available to UE 115-*a* with a calibration point selected based on reserved power 415. Accordingly, when base station 105-*a* receives the uplink transmission in TTI 305-*a* on reference carrier 205-*a*, base station 105-*a* may determine that UE 115-*a* had to select an updated calibration point for the uplink transmission. Thus, base station 105-*a* may identify a break in phase continuity of the uplink transmission in TTI 305-*a*, and base station 105-*a* may demodulate the transmission in TTI 305-*a* based on identifying the break in phase continuity of the uplink transmission in TTI 305-*a*. Although, the present example describes that the transient period 320 is between a first sTTI 310-*a* and a second sTTI 310-*b*, UE 115-*a* may use a transient period to adjust its transmit power between any two sTTIs if the desired transmit power in a subsequent sTTI exceeds the calibrated power of a calibration point selected for transmissions in a previous sTTI.

Figure 5:
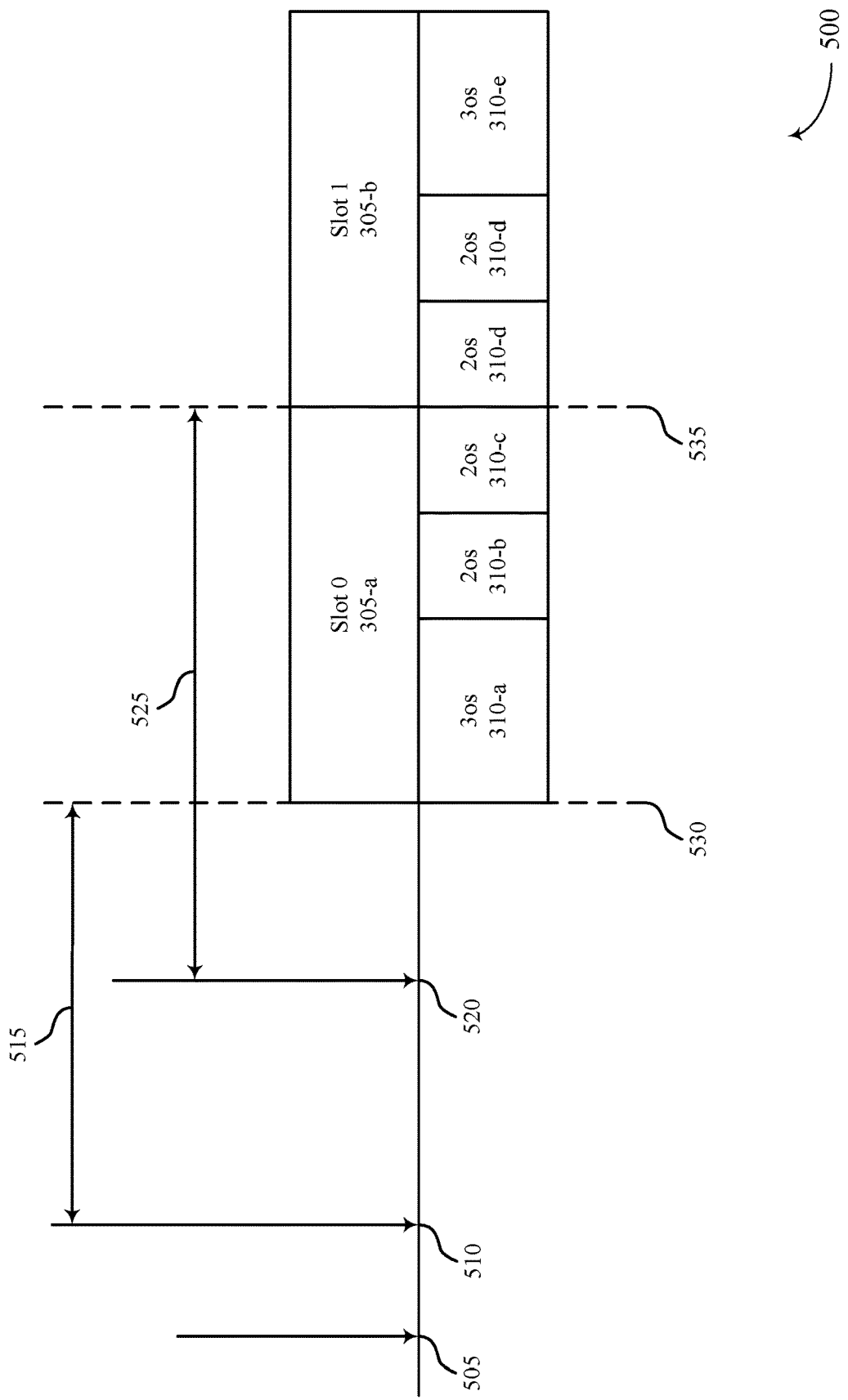
FIGS. 5 and 6 illustrate timelines of communications between a base station and a UE in accordance with various aspects of the present disclosure.
Figure 6:
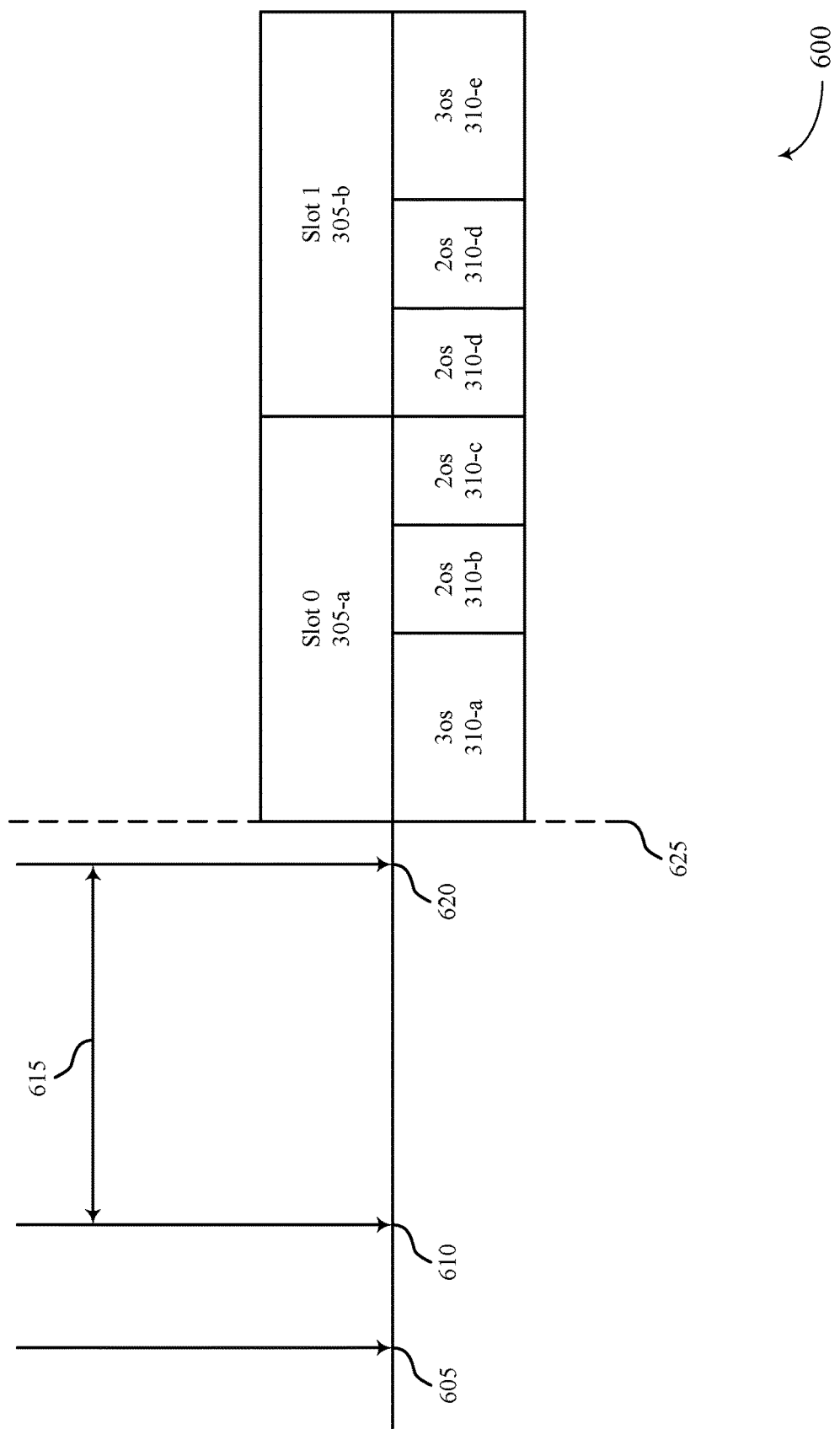

The UE 115-*a* may determine the amount of power to reserve for expected increases in power during TTI 305-*a* (i.e., reserved power 415) using various techniques. In some cases, UE 115-*a* may receive an indication of the amount of power to reserve from base station 105-*a* (e.g., via periodic signaling, aperiodic signaling, radio resource control (RRC) signaling, etc.). In such cases, the base station 105-*a* may configure multiple UEs (e.g., including UE 115-*a*) to reserve the same amount of power for expected increases in power during a TTI. Alternatively, the base station 105-*a* may determine the amount of power that a specific UE 115 should reserve for expected increases in power during a TTI based on the transmission requirements of that UE. The underlying algorithm (or algorithms) used to determine the amount of power that a specific UE 115 should reserve for expected increases in power during a TTI may be the same for different UEs or may be applied to multiple UEs. In other cases, UE 115-*a* may autonomously determine the amount of power to reserve based on an estimate of expected increases in power during TTI 305-*a*. In such cases, the UE 115-*a* may indicate the amount of power reserved to base station 105-*a* in, for example, a PHR report transmitted to base station 105-*a*. FIGS. 5 and 6 illustrate examples of the different techniques used (e.g., by a UE 115) to determine the amount of power to reserve for expected increases in power during a TTI 305.

FIG. 5 illustrates a timeline 500 of communications between base station 105-*a* and UE 115-*a* in accordance with various aspects of the present disclosure. In the example of FIG. 5, base station 105-*a* may indicate an amount of power for UE 115-*a* to reserve for expected increases in transmit power during TTI 305-*a*. At 505, base station 105-*a* may transmit power control information for a subframe including slot 305-*a* and slot 305-*b* to UE 115-*a*, and, at 510, base station 105-*a* may indicate the amount of power for UE 115-*a* to reserve for expected increases in transmit power during TTI 305-*a*. In some examples, base station 105-*a* may also indicate a first transmit power for UE 115-*a* to use for an uplink transmission in TTI 305-*a* and a second transmit power for UE 115-*a* to use for an uplink transmission in sTTI 310-*a*.

UE 115-*a* may then demodulate the information received from base station 105-*a* at 505 and 510 (e.g., during time period 515 prior to TTI boundary 530), and UE 115-*a* may use this information to select a calibration point for uplink transmissions during TTI 305-*a*. In some cases, UE 115-*a* may sum the first transmit power, the second transmit power, and the amount of power reserved for expected increases in transmit power during TTI 305-*a*, and UE 115-*a* may select the calibration point for uplink transmissions during TTI 305-*a* based on the sum. That is, UE 115-*a* may identify a calibration point associated with a transmit power that is equal to the sum or greater than and closest to the sum, and the UE 115-*a* may select this calibration point for uplink transmissions during TTI 305-*a*. Once UE 115-*a* determines the calibration point, UE 115-*a* may transmit during TTI 305-*a* based on the transmit power associated with the calibration point using the techniques described with reference to FIGS. 2-4.

At 520, UE 115-*a* may receive another indication of an amount of power to reserve for expected increases in transmit power during TTI 305-*b*, and UE 115-*a* may demodulate the indication during time period 525 prior to TTI boundary 535. UE 115-*a* may then use this information to select a calibration point for uplink transmissions during TTI 305-*b*. In some cases, base station 105-*a* may determine the amount of power for UE 115-*a* to reserve for expected increases in transmit power during TTI 305-*b* based on an actual amount of power reserved by UE 115-*a* in TTI 305-*a*. For example, because the UE 115-*a* may be calibrated with discrete calibration points associated with discrete power levels, the actual amount of power reserved during TTI 305-*a* may be greater than the amount of power indicated by base station 105-*a* (i.e., at 510).

Accordingly, UE 115 may indicate the actual amount of power reserved during TTI 305-*a*, and base station 105-*a* may use this information to determine the amount of power for UE 115-*a* to reserve during TTI 305-*b*. Using this feedback procedure, base station 105-*a* may be able to optimize the amount of power reserved by UE 115 for uplink transmissions in a TTI. If UE 115-*a* reserves a high amount of power for expected transmit power increases in a TTI, UE 115-*a* may be able to quickly adjust its transmit power by adjusting a digital back-off from a calibrated power. However, the PA at the UE 115-*a* may be less efficient. Alternatively, if the UE 115-*a* reserves a low amount of power for expected transmit power increases in a TTI, the PA at the UE 115-*a* may be more efficient. However, base station 105-*a* may have to allocate transient periods more frequently for UE 115-*a* to adjust its transmit power.

FIG. 6 illustrates a timeline 600 of communications between base station 105-*a* and UE 115-*a* in accordance with various aspects of the present disclosure. In the example of FIG. 6, UE 115-*a* may autonomously determine an amount of power to reserve for expected increases in transmit power during TTI 305-*a*. At 605, base station 105-*a* may transmit power control information for a subframe including slot 305-*a* and slot 305-*b* to UE 115-*a*, and, at 610, base station 105-*a* may transmit an indication of a first transmit power for UE 115-*a* to use for uplink transmissions during TTI 305-*a* and a second transmit power for UE 115-*a* to use for uplink transmissions during sTTI 310-*a*.

UE 115-*a* may then demodulate the power control information and the indication of the first and second transmit powers prior to TTI boundary 625 during time period 615, and, at 620, UE 115-*a* may determine an amount of power to reserve for expected increases in transmit power during TTI 305-*a* based on the first transmit power and the second transmit power. UE 115-*a* may then select a calibration point for uplink transmissions during TTI 305-*a* based on the amount of power reserved. Once UE 115-*a* selects the calibration point, UE 115-*a* may transmit during TTI 305-*a* based on the transmit power associated with the calibration point using the techniques described with reference to FIGS. 2-4.

In addition, at 620, UE 115-*a* may transmit an indication of the amount of power reserved to base station 105-*a* (e.g., in a PHR report). In the example of FIG. 6, base station 105-*a* may not be able to demodulate the indication of the amount of power reserved for expected transmit power increases during TTI 305-*a* prior to TTI boundary 625. Instead, in some examples, the base station may finish demodulating the indication of the amount of power reserved during sTTI 310-*b*. Thus, base station 105-*a* may not be able to determine if a desired transmit power at the boundary of sTTI 310-*b* exceeds a sum of the first transmit power, second transmit power, and the reserved amount of power. As such, if the desired transmit power exceeds the sum, base station 105-*a* may not be able to allocate a transient period to UE 115-*a* for a transmit power adjustment.

In order to ensure that base station 105-*a* is aware of the amount of power reserved for expected increases in transmit power during a TTI 305, UE 115-*a* may determine the amount of power to reserve during the TTI 305 earlier (e.g., independent of the first and second transmit powers), and UE 115-*a* may transmit the indication of the amount of power reserved to base station 105-*a* earlier. Alternatively, as described with reference to FIG. 5, the base station 105-*a* may determine the amount of power for UE 115-*a* to reserve for expected increases in transmit power during a TTI 305, and base station 105-*a* may relay this information to UE 115-*a*. When base station 105-*a* is aware of the amount of power reserved during a TTI 305 prior to the TTI (or prior to an sTTI), base station 105-*a* may be able to allocate transient periods to UE 115-*a* when an updated desired transmit power exceeds a power associated with a configured calibration point. Additionally, base station 105-*a* may be able to schedule transmissions in the different sTTIs (e.g., in order of decreasing power requirements) to maximize performance on the carriers 205.

Although the examples described in FIGS. 5 and 6 discuss reserving power for expected increases in transmit power during slots 305 and selecting a calibration point at the beginning of slots 305 on carrier 205-*a*, it is to be understood that the same techniques for reserving power for expected increases in transmit power and selecting a calibration point based on the amount of power reserved may be applied to TTIs having different durations (e.g., a subframe). Further, although a UE 115-*a* may be scheduled to use a transient period to select an updated calibration point at the boundaries of slots 305 (or TTIs having different durations), the techniques described herein may limit the number of transient periods scheduled since a transient period may not be scheduled at the boundaries of all sTTIs on carrier 205-*b*.

Figure 7:
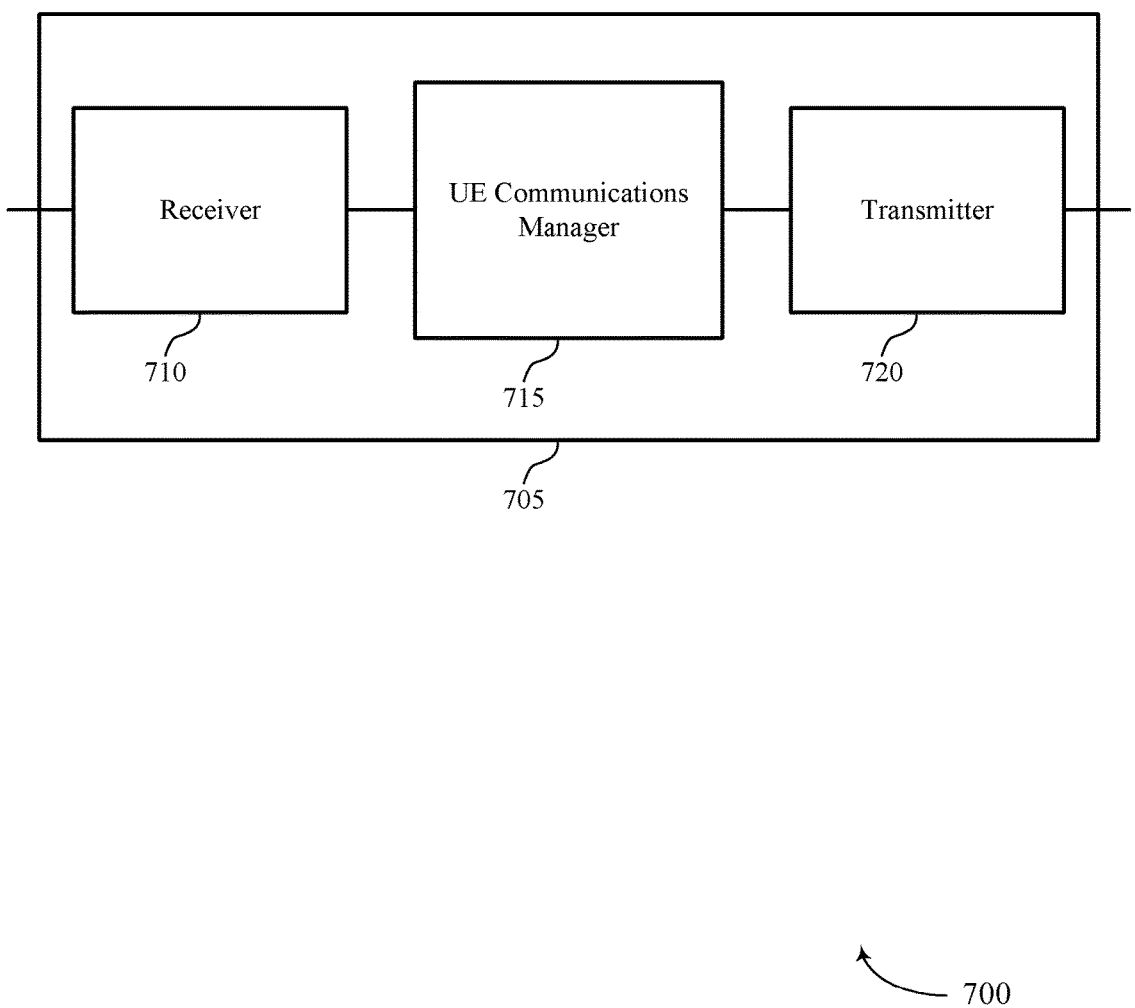
FIGS. 7 and 8 show block diagrams of a device that supports power reservation for carrier aggregation signaling during sTTIs in accordance with various aspects of the present disclosure.

FIG. 7 shows a block diagram 700 of a wireless device 705 that supports power reservation for carrier aggregation signaling during sTTIs in accordance with various aspects of the present disclosure. Wireless device 705 may be an example of aspects of a UE 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to power reservation for carrier aggregation signaling during sTTIs, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9. UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with various aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may identify, from a set of component carriers used in carrier aggregation communication, a first component carrier having a first TTI duration as a reference component carrier and a second component carrier having a second TTI duration different from the first TTI duration, determine, at a first TTI boundary of a first TTI of the reference component carrier, a first transmit power for the reference component carrier and a second transmit power for a second component carrier of the set of component carriers, and determine an amount of transmit power to be reserved during the first TTI for adjusting the second transmit power at second TTI boundaries of the second component carrier. UE communications manager 715 may then coordinate with transmitter 720 to transmit, during the first TTI, at the first transmit power for the reference component carrier and at the second transmit power for the second component carrier, based at least in part on the amount of transmit power reserved.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
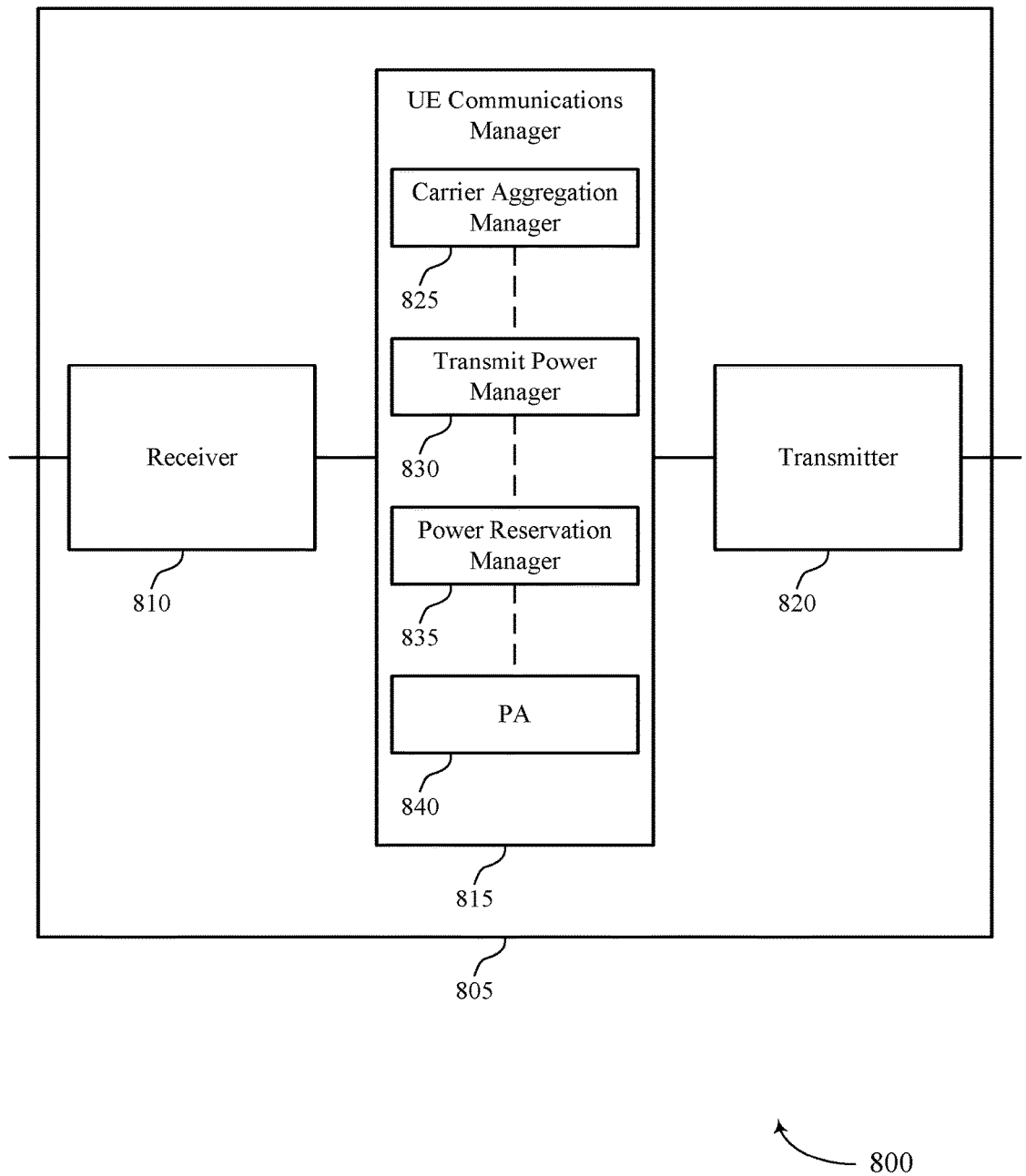

FIG. 8 shows a block diagram 800 of a wireless device 805 that supports power reservation for carrier aggregation signaling during sTTIs in accordance with various aspects of the present disclosure. Wireless device 805 may be an example of aspects of a wireless device 705 or a UE 115 as described with reference to FIG. 7. Wireless device 805 may include receiver 810, UE communications manager 815, and transmitter 820. UE communications manager 815 may be an example of aspects of the UE communications manager 915 described with reference to FIG. 9. UE communications manager 815 may include carrier aggregation manager 825, transmit power manager 830, power reservation manager 835, and PA 840. Wireless device 805 may also include a processor. Each of these components may be in communication with one another (e.g., via one or more buses).

Receiver 810 may receive information such as packets, user data, or control information associated with various information channels (e.g., control channels, data channels, and information related to power reservation for carrier aggregation signaling during sTTIs, etc.). Information may be passed on to other components of the device. The receiver 810 may be an example of aspects of the transceiver 935 described with reference to FIG. 9. The receiver 810 may utilize a single antenna or a set of antennas.

Carrier aggregation manager 825 may identify, from a set of component carriers used in carrier aggregation communication, a first component carrier having a first TTI duration as a reference component carrier and a second component carrier having a second TTI duration different from the first TTI duration. In some cases, identifying the reference component carrier is based on the first TTI duration being longer than the second TTI duration. In some cases, the reference component carrier and the second component carrier are within a same frequency band.

Transmit power manager 830 may determine, at a first TTI boundary of a first TTI of the reference component carrier, a first transmit power for the reference component carrier and a second transmit power for a second component carrier of the set of component carriers. Power reservation manager 835 may determine an amount of transmit power to be reserved during the first TTI for adjusting the second transmit power at second TTI boundaries of the second component carrier. In some cases, the amount of transmit power reserved during the TTI is based at least in part on expected transmit power increases on the second component carrier during the first TTI of the reference component carrier. Power reservation manager 835 may transmit an indication of an actual amount of power reserved for the expected transmit power increases on the second component carrier during the first TTI of the reference component carrier. UE communications manager 815 may then coordinate with transmitter 820 to transmit, during the first TTI, at the first transmit power for the reference component carrier and at the second transmit power for the second component carrier, based at least in part on the amount of transmit power reserved.

In some cases, determining the amount of transmit power to be reserved during the first TTI includes receiving, from a base station, an indication of the amount of transmit power to be reserved during the first TTI. In some cases, determining the amount of transmit power to be reserved during the first TTI includes autonomously determining the amount of transmit power to reserve during the first TTI, and transmitting, to a base station, an indication of the amount of transmit power reserved during the first TTI. In some cases, the indication is transmitted in a PHR report. In some cases, the reserved amount of transmit power is equal to a PHR associated with transmissions on the reference component carrier and the second component carrier during the first TTI. In some cases, the reserved amount of transmit power is less than a PHR associated with transmissions on the reference component carrier and the second component carrier during the first TTI.

PA 840 may select a PA gain value for a calibration point based on the amount of transmit power reserved during the first TTI, the first transmit power, and the second transmit power. In some cases, transmitting during the first TTI includes digitally backing off from a transmit power corresponding to the PA gain value for the calibration point. In some cases, transmit power manager 830 may identify an updated second transmit power for the second component carrier during a duration of the first TTI and at a second TTI boundary of a second TTI on the second component carrier, the second TTI boundary being unaligned with the first TTI boundary, and PA 840 may maintain the PA gain value for the calibration point while transmitting during the first TTI at the first transmit power for the reference component carrier and at the updated second transmit power for the second component carrier. In some cases, maintaining the PA gain value for the calibration point includes adjusting an amount of digital back-off from the transmit power corresponding to the PA gain value for the calibration point.

In some cases, transmit power manager 830 may identify an updated second transmit power for the second component carrier during a duration of the first TTI and at a second TTI boundary of a second TTI on the second component carrier, the second TTI boundary being unaligned with the first TTI boundary, and transmit power manager 830 may identify that a sum of the first transmit power and the updated second transmit power exceeds the transmit power corresponding to the PA gain value for the calibration point. In such cases, PA 840 may identify a transient period for a PA gain adjustment, and PA 840 may update the PA gain value for a different calibration point during the transient period based on the first transmit power and the updated second transmit power. UE communications manager 815 may then coordinate with transmitter 820 to transmit, during the first TTI of the reference component carrier and during the second TTI of the second component carrier, at the first transmit power for the reference component carrier and at the updated second transmit power for the second component carrier. In some cases, the second TTI includes any one of one or more TTIs of the second component carrier that overlap with the first TTI of the first component carrier.

In some cases, the PA gain value for the calibration point is selected based on a sum of the amount of transmit power reserved during the first TTI, the first transmit power, and the second transmit power. In some cases, the transmit power corresponding to the PA gain value for the calibration point is equal to or greater than the sum of the amount of transmit power reserved during the first TTI, the first transmit power, and the second transmit power. In some cases, a same PA 840 is used by the UE for transmissions on the reference component carrier and the second component carrier.

Transmitter 820 may transmit signals generated by other components of the device. In some examples, the transmitter 820 may be collocated with a receiver 810 in a transceiver module. For example, the transmitter 820 may be an example of aspects of the transceiver 935 described with reference to FIG. 9. The transmitter 820 may utilize a single antenna or a set of antennas.

Figure 9:
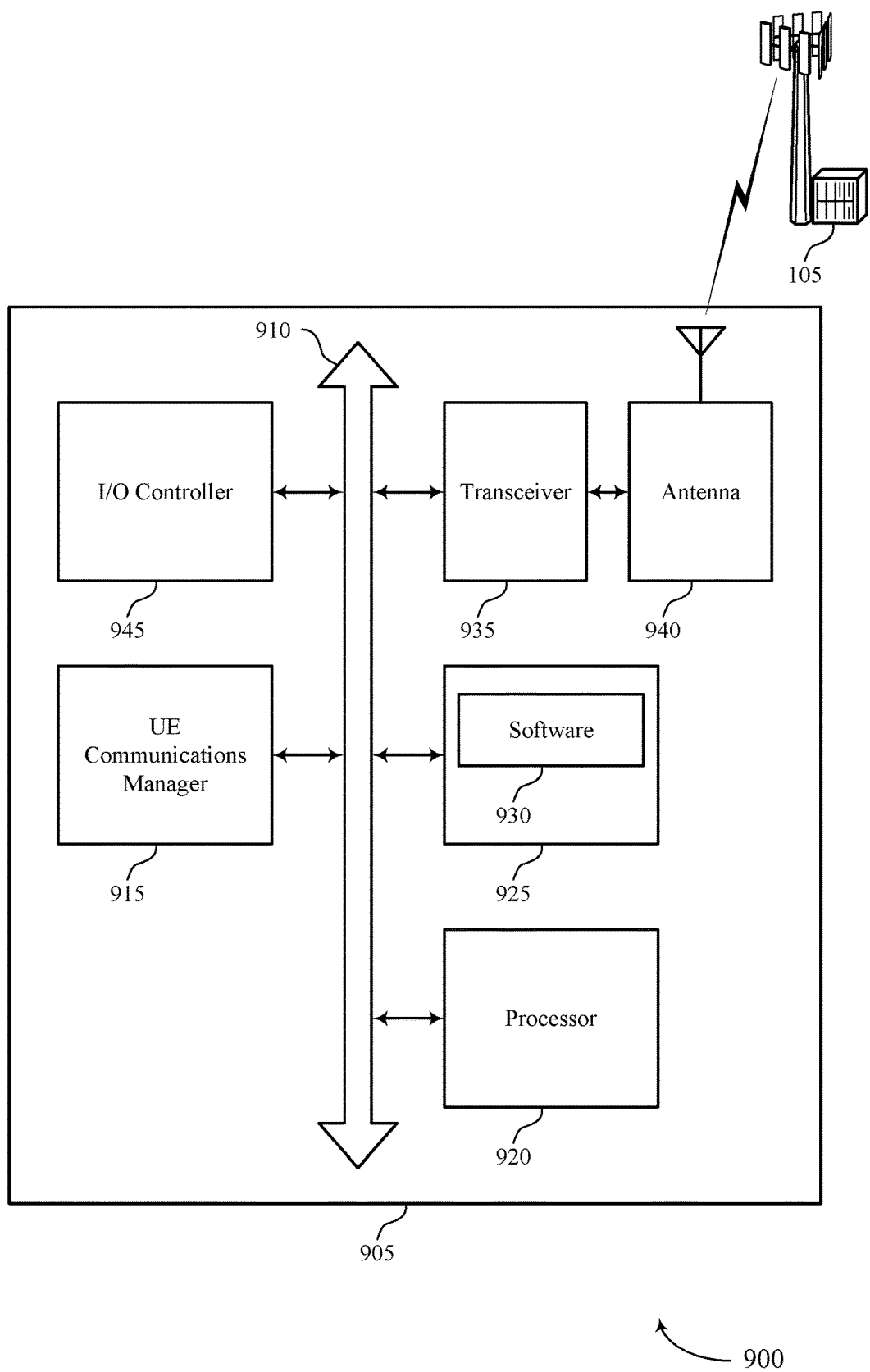
FIG. 9 illustrates a block diagram of a system including a UE that supports power reservation for carrier aggregation signaling during sTTIs in accordance with various aspects of the present disclosure.

FIG. 9 shows a diagram of a system 900 including a device 905 that supports power reservation for carrier aggregation signaling during sTTIs in accordance with various aspects of the present disclosure. Device 905 may be an example of or include the components of wireless device 705, wireless device 805, or a UE 115 as described above, e.g., with reference to FIGS. 7 and 8. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting power reservation for carrier aggregation signaling during sTTIs).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support power reservation for carrier aggregation signaling during sTTIs. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
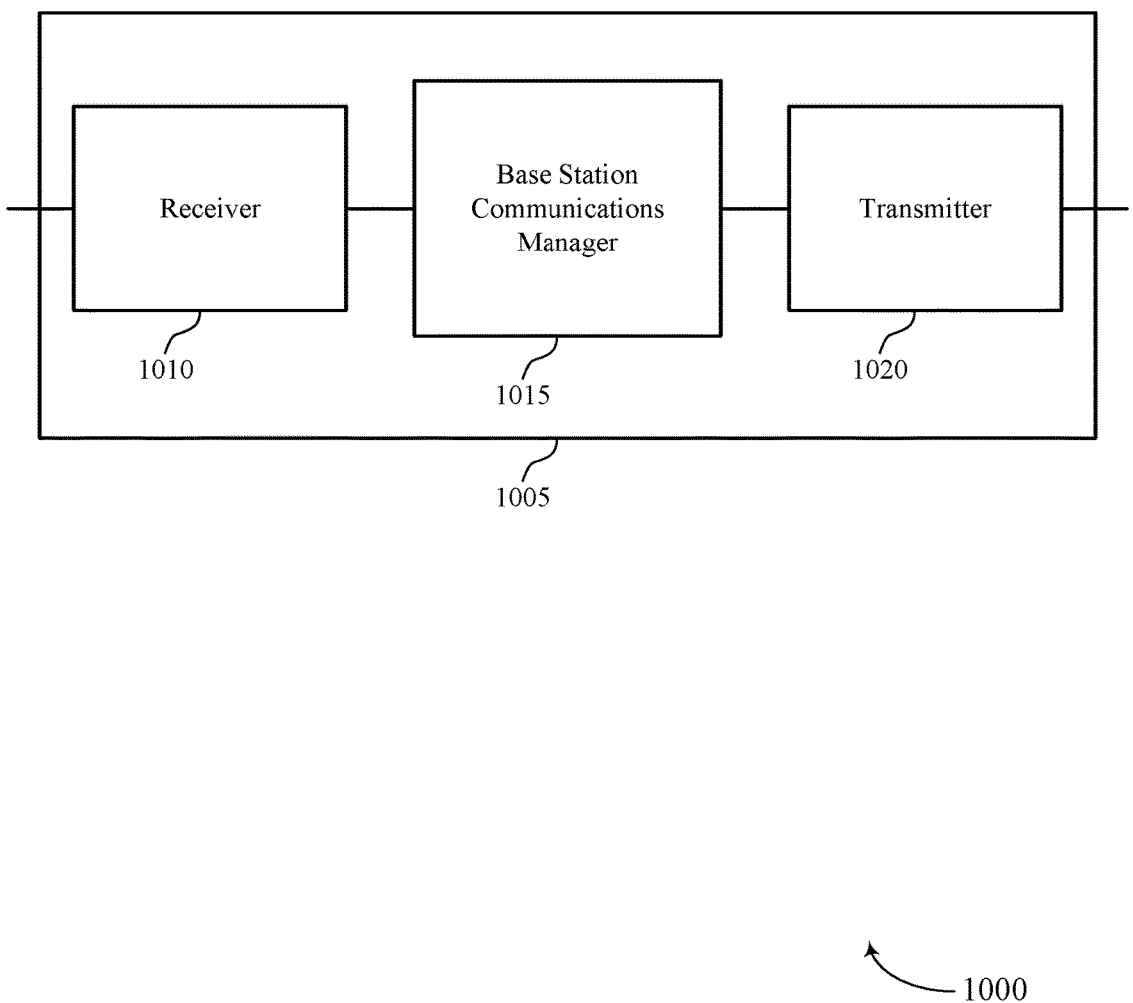
FIGS. 10 and 11 show block diagrams of a device that supports power reservation for carrier aggregation signaling during sTTIs in accordance with various aspects of the present disclosure.

FIG. 10 shows a block diagram 1000 of a wireless device 1005 that supports power reservation for carrier aggregation signaling during sTTIs in accordance with various aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to power reservation for carrier aggregation signaling during sTTIs, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12. Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may identify, from a set of component carriers used in carrier aggregation communication, a first component carrier as a reference component carrier, transmit, to a UE, a first indication of a first transmit power for transmissions on the reference component carrier during a first TTI and a second transmit power for transmissions on a second component carrier of the set of component carriers during a second TTI that at least partially overlaps with the first TTI, identify a reserved amount of transmit power based on expected transmit power increases on the second component carrier during the first TTI of the reference component carrier, and transmit, to the UE, a reserved power indication indicating the reserved amount of transmit power to be used by the UE in selecting a PA gain value for a calibration point.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
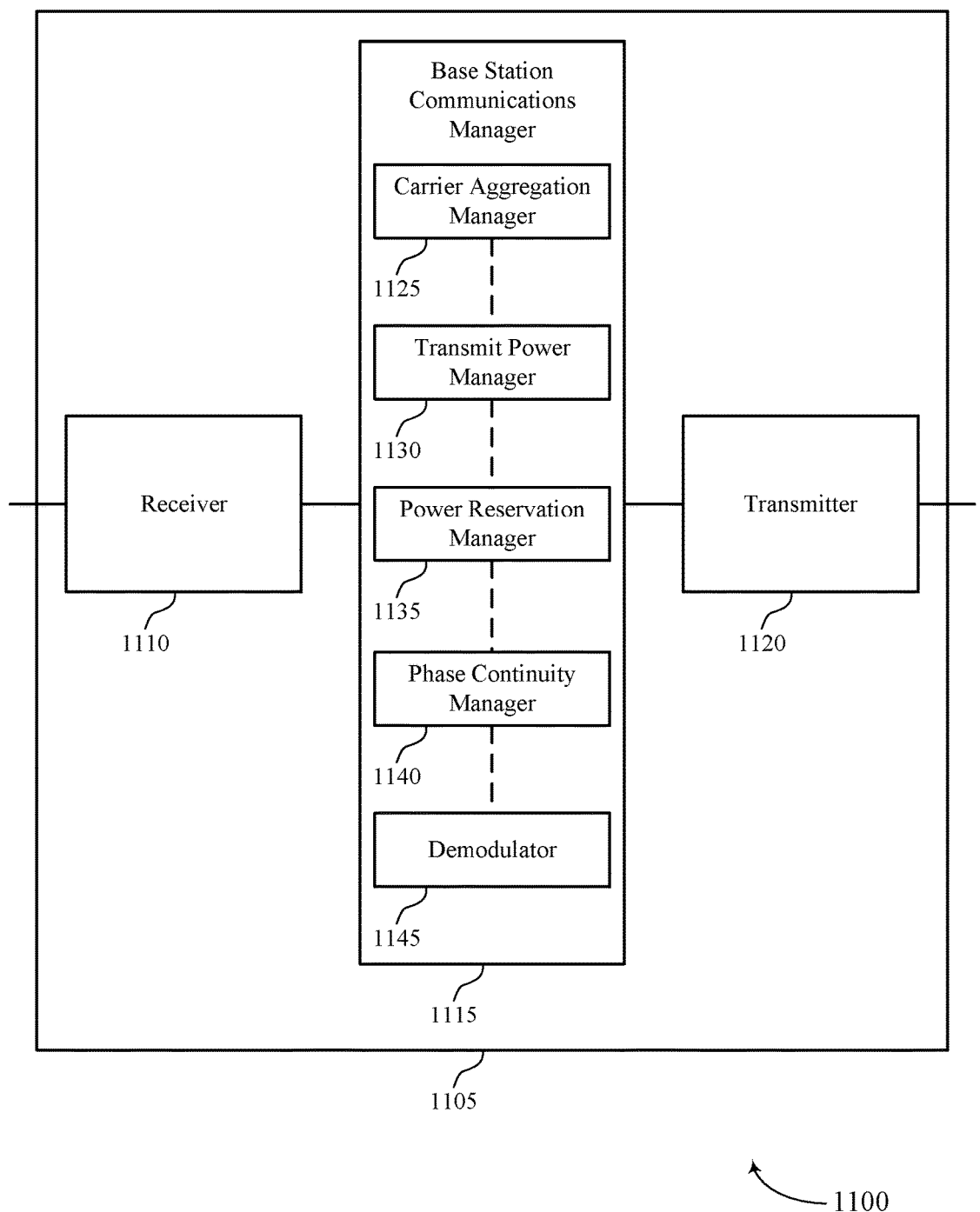

FIG. 11 shows a block diagram 1100 of a wireless device 1105 that supports power reservation for carrier aggregation signaling during sTTIs in accordance with various aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Base station communications manager 1115 may be an example of aspects of the base station communications manager 1215 described with reference to FIG. 12. Base station communications manager 1115 may include carrier aggregation manager 1125, transmit power manager 1130, power reservation manager 1135, phase continuity manager 1140, and demodulator 1145. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to power reservation for carrier aggregation signaling during sTTIs, etc.). Information may be passed on to other components of the device. The receiver 1110 may be an example of aspects of the transceiver 1235 described with reference to FIG. 12. The receiver 1110 may utilize a single antenna or a set of antennas.

Carrier aggregation manager 1125 may identify, from a set of component carriers used in carrier aggregation communication, a first component carrier as a reference component carrier. Transmit power manager 1130 may transmit, to a UE, a first indication of a first transmit power for transmissions on the reference component carrier during a first TTI and a second transmit power for transmissions on a second component carrier of the set of component carriers during a second TTI that at least partially overlaps with the first TTI. In some cases, identifying the reference component carrier is based on the first TTI of the reference component carrier having a longer duration than a duration of the second TTI of the second component carrier. In some cases, the reference component carrier and the second component carrier are within a same frequency band.

Power reservation manager 1135 may identify a reserved amount of transmit power based on expected transmit power increases on the second component carrier during the first TTI of the reference component carrier. Power reservation manager 1135 may then transmit, to the UE, a reserved power indication indicating the reserved amount of transmit power to be used by the UE in selecting a PA gain value for a calibration point. In some cases, the reserved amount of transmit power is equal to a PHR associated with transmissions on the reference component carrier and the second component carrier during the first TTI. In some cases, the reserved amount of transmit power is less than a PHR associated with transmissions on the reference component carrier and the second component carrier during the first TTI. In some cases, power reservation manager 1135 may receive, from the UE, a PA power indication indicating an actual amount of power reserved for the expected transmit power increases on the second component carrier during the first TTI of the reference component carrier, and determine an updated reserved amount of transmit power for a subsequent TTI on the reference component carrier based on receiving the PA power indication.

In some cases, power reservation manager 1135 may identify an updated second transmit power used for transmissions on the second component carrier during a third TTI that at least partially overlaps with the first TTI. Power reservation manager 1135 may then determine that a sum of the first transmit power and the updated second transmit power exceeds a transmit power corresponding to the PA gain value for the calibration point. Phase continuity manager 1140 may identify a break in phase continuity of the transmissions on the reference component carrier during the first TTI based on the determination, and demodulator 1145 may demodulate the transmissions on the reference component carrier during the first TTI based on identifying the break in phase continuity.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1235 described with reference to FIG. 12. The transmitter 1120 may utilize a single antenna or a set of antennas.

Figure 12:
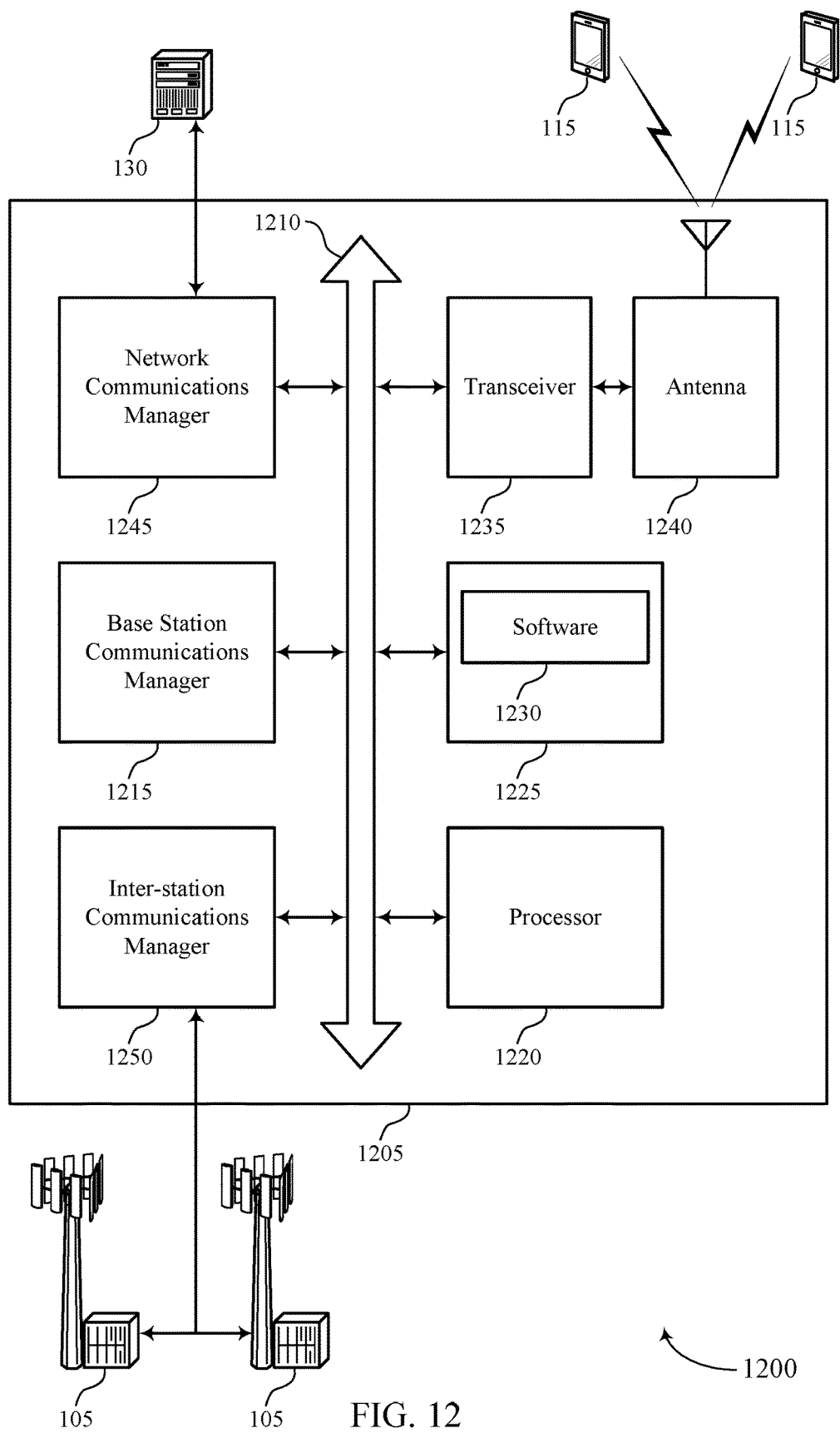
FIG. 12 illustrates a block diagram of a system including a base station that supports power reservation for carrier aggregation signaling during sTTIs in accordance with various aspects of the present disclosure.

FIG. 12 shows a diagram of a system 1200 including a device 1205 that supports power reservation for carrier aggregation signaling during sTTIs in accordance with various aspects of the present disclosure. Device 1205 may be an example of or include the components of base station 105 as described above, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting power reservation for carrier aggregation signaling during sTTIs).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support power reservation for carrier aggregation signaling during sTTIs. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some cases, the wireless device may include a single antenna 1240. However, in some cases the device may have more than one antenna 1240, which may be capable of concurrently transmitting or receiving multiple wireless transmissions. Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base stations 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
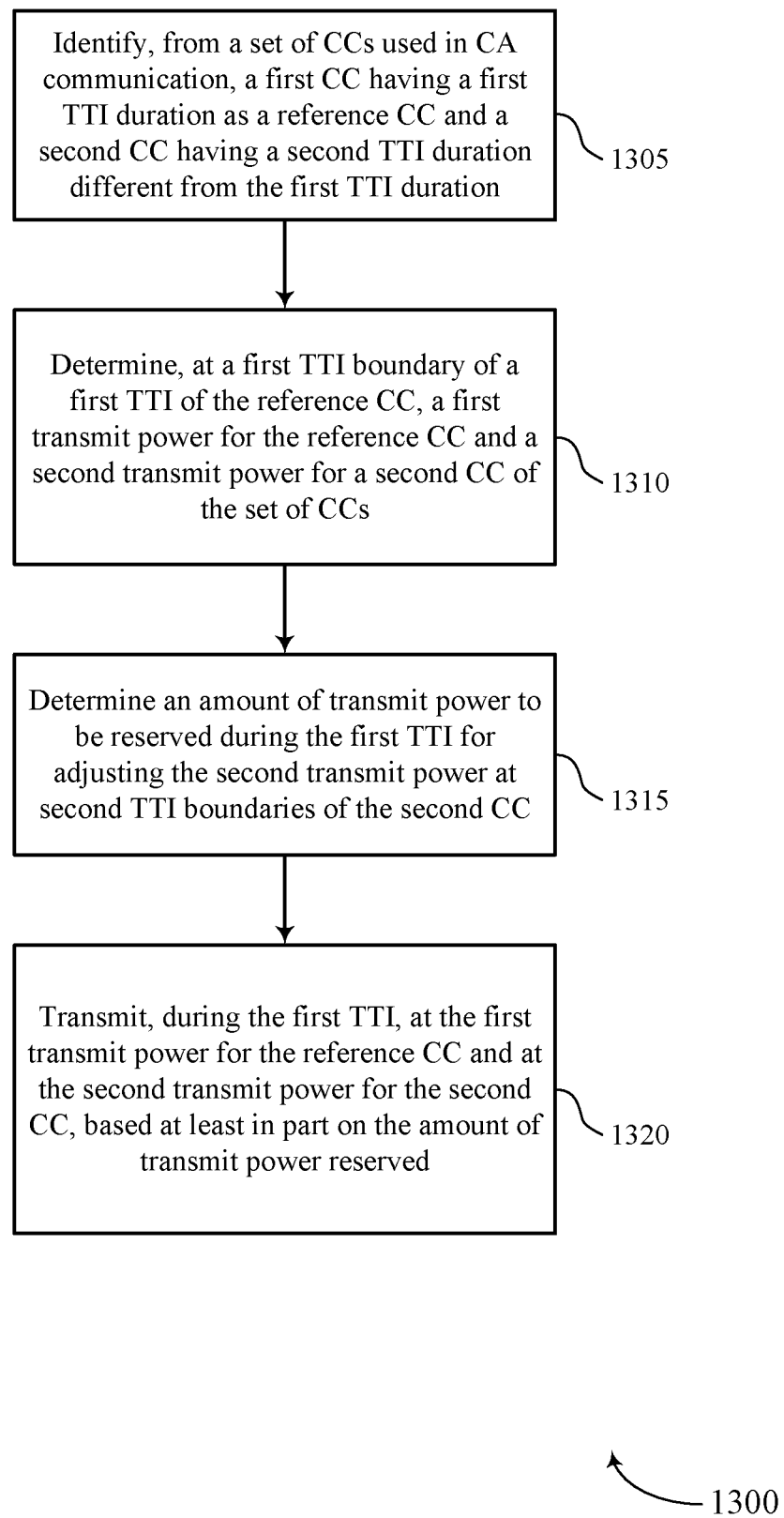
FIGS. 13-16 illustrate methods for power reservation for carrier aggregation signaling during sTTIs in accordance with various aspects of the present disclosure.

FIG. 13 shows a flowchart illustrating a method 1300 for power reservation for carrier aggregation signaling during sTTIs in accordance with various aspects of the present disclosure. The operations of method 1300 may be implemented by a UE 115 or its components as described herein. For example, the operations of method 1300 may be performed by a UE communications manager as described with reference to FIGS. 7 through 9. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may identify, from a plurality of component carriers used in carrier aggregation communication, a first component carrier having a first TTI duration as a reference component carrier and a second component carrier having a second TTI duration different from the first TTI duration. The operations of block 1305 may be performed according to the methods described herein. In certain examples, aspects of the operations of block 1305 may be performed by a carrier aggregation manager as described with reference to FIGS. 7 through 9.

At block 1310 the UE 115 may determine, at a first TTI boundary of a first TTI of the reference component carrier, a first transmit power for the reference component carrier and a second transmit power for a second component carrier of the plurality of component carriers. The operations of block 1310 may be performed according to the methods described herein. In certain examples, aspects of the operations of block 1310 may be performed by a transmit power manager as described with reference to FIGS. 7 through 9.

At block 1315 the UE 115 may determine an amount of transmit power to be reserved during the first TTI for adjusting the second transmit power at second TTI boundaries of the second component carrier. The operations of block 1315 may be performed according to the methods described herein. In certain examples, aspects of the operations of block 1315 may be performed by a power reservation manager as described with reference to FIGS. 7 through 9.

At block 1320 the UE 115 may transmit, during the first TTI, at the first transmit power for the reference component carrier and at the second transmit power for the second component carrier, based at least in part on the amount of transmit power reserved. The operations of block 1320 may be performed according to the methods described herein. In certain examples, aspects of the operations of block 1320 may be performed by a transmitter as described with reference to FIGS. 7 through 9.

Figure 14:
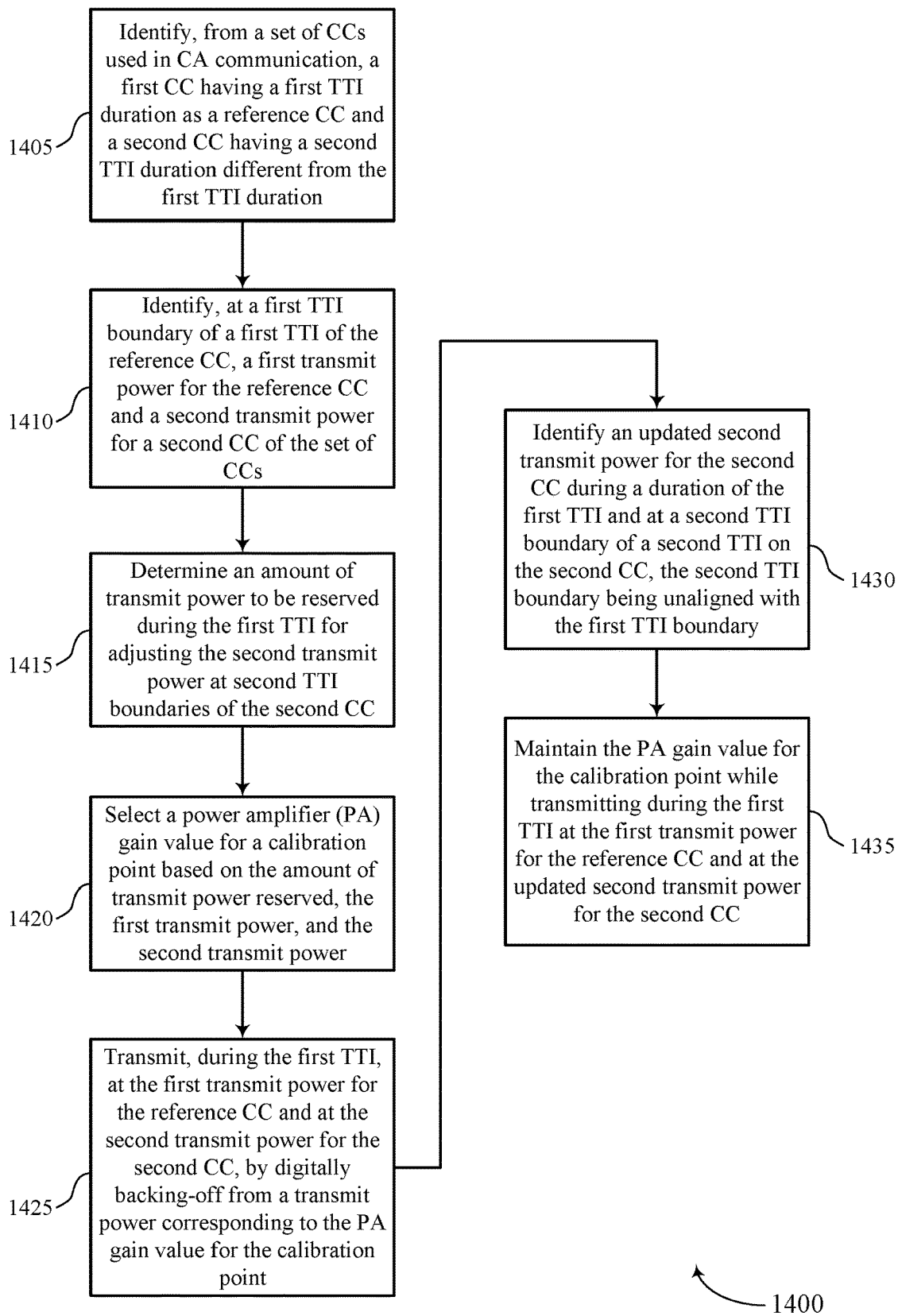

FIG. 14 shows a flowchart illustrating a method 1400 for power reservation for carrier aggregation signaling during sTTIs in accordance with various aspects of the present disclosure. The operations of method 1400 may be implemented by a UE 115 or its components as described herein. For example, the operations of method 1400 may be performed by a UE communications manager as described with reference to FIGS. 7 through 9. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may identify, from a plurality of component carriers used in carrier aggregation communication, a first component carrier having a first TTI duration as a reference component carrier and a second component carrier having a second TTI duration different from the first TTI duration. The operations of block 1405 may be performed according to the methods described herein. In certain examples, aspects of the operations of block 1405 may be performed by a carrier aggregation manager as described with reference to FIGS. 7 through 9.

At block 1410 the UE 115 may identify, at a first TTI boundary of a first TTI of the reference component carrier, a first transmit power for the reference component carrier and a second transmit power for a second component carrier of the plurality of component carriers. The operations of block 1410 may be performed according to the methods described herein. In certain examples, aspects of the operations of block 1410 may be performed by a transmit power manager as described with reference to FIGS. 7 through 9.

At block 1415 the UE 115 may determine an amount of transmit power to be reserved during the first TTI for adjusting the second transmit power at second TTI boundaries of the second component carrier. The operations of block 1415 may be performed according to the methods described herein. In certain examples, aspects of the operations of block 1415 may be performed by a power reservation manager as described with reference to FIGS. 7 through 9.

At block 1420 the UE 115 may select a PA gain value for a calibration point based at least in part on the amount of transmit power reserved, the first transmit power, and the second transmit power. The operations of block 1420 may be performed according to the methods described herein. In certain examples, aspects of the operations of block 1420 may be performed by a PA as described with reference to FIGS. 7 through 9.

At block 1425 the UE 115 may transmit, during the first TTI, at the first transmit power for the reference component carrier and at the second transmit power for the second component carrier, by digitally backing-off from a transmit power corresponding to the PA gain value for the calibration point. The operations of block 1425 may be performed according to the methods described herein. In certain examples, aspects of the operations of block 1425 may be performed by a transmitter as described with reference to FIGS. 7 through 9.

At block 1430 the UE 115 may identify an updated second transmit power for the second component carrier during a duration of the first TTI and at a second TTI boundary of a second TTI on the second component carrier, the second TTI boundary being unaligned with the first TTI boundary. The operations of block 1430 may be performed according to the methods described herein. In certain examples, aspects of the operations of block 1430 may be performed by a transmit power manager as described with reference to FIGS. 7 through 9.

At block 1435 the UE 115 may maintain the PA gain value for the calibration point while transmitting during the first TTI at the first transmit power for the reference component carrier and at the updated second transmit power for the second component carrier. In some cases, maintaining the PA gain value for the calibration point includes adjusting an amount of digital back-off from a transient power corresponding to the PA gain value for the calibration point. The operations of block 1435 may be performed according to the methods described herein. In certain examples, aspects of the operations of block 1435 may be performed by a PA as described with reference to FIGS. 7 through 9.

Figure 15:
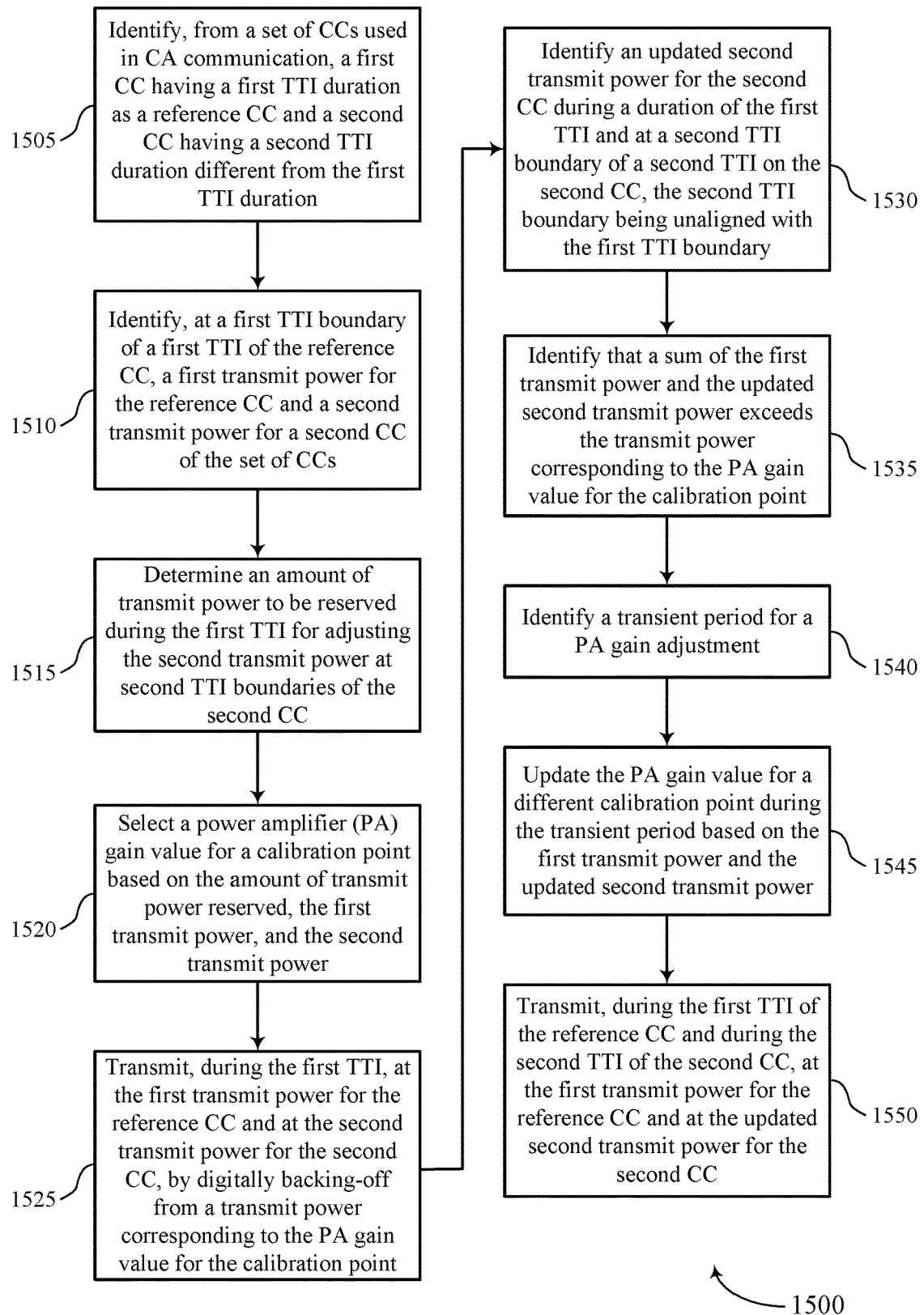

FIG. 15 shows a flowchart illustrating a method 1500 for power reservation for carrier aggregation signaling during sTTIs in accordance with various aspects of the present disclosure. The operations of method 1500 may be implemented by a UE 115 or its components as described herein. For example, the operations of method 1500 may be performed by a UE communications manager as described with reference to FIGS. 7 through 9. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may identify, from a plurality of component carriers used in carrier aggregation communication, a first component carrier having a first TTI duration as a reference component carrier and a second component carrier having a second TTI duration different from the first TTI duration. The operations of block 1505 may be performed according to the methods described herein. In certain examples, aspects of the operations of block 1505 may be performed by a carrier aggregation manager as described with reference to FIGS. 7 through 9.

At block 1510 the UE 115 may identify, at a first TTI boundary of a first TTI of the reference component carrier, a first transmit power for the reference component carrier and a second transmit power for a second component carrier of the plurality of component carriers. The operations of block 1510 may be performed according to the methods described herein. In certain examples, aspects of the operations of block 1510 may be performed by a transmit power manager as described with reference to FIGS. 7 through 9.

At block 1515 the UE 115 may determine an amount of transmit power to be reserved during the first TTI for adjusting the second transmit power at second TTI boundaries of the second component carrier. The operations of block 1515 may be performed according to the methods described herein. In certain examples, aspects of the operations of block 1515 may be performed by a power reservation manager as described with reference to FIGS. 7 through 9.

At block 1520 the UE 115 may select a PA gain value for a calibration point based at least in part on the amount of transmit power reserved, the first transmit power, and the second transmit power. The operations of block 1520 may be performed according to the methods described herein. In certain examples, aspects of the operations of block 1520 may be performed by a PA as described with reference to FIGS. 7 through 9.

At block 1525 the UE 115 may transmit, during the first TTI, at the first transmit power for the reference component carrier and at the second transmit power for the second component carrier, by digitally backing-off from a transmit power corresponding to the PA gain value for the calibration point. The operations of block 1525 may be performed according to the methods described herein. In certain examples, aspects of the operations of block 1525 may be performed by a transmitter as described with reference to FIGS. 7 through 9.

At block 1530 the UE 115 may identify an updated second transmit power for the second component carrier during a duration of the first TTI and at a second TTI boundary of a second TTI on the second component carrier, the second TTI boundary being unaligned with the first TTI boundary. The operations of block 1530 may be performed according to the methods described herein. In certain examples, aspects of the operations of block 1530 may be performed by a transmit power manager as described with reference to FIGS. 7 through 9.

At block 1535 the UE 115 may identify that a sum of the first transmit power and the updated second transmit power exceeds the transmit power corresponding to the PA gain value for the calibration point. The operations of block 1535 may be performed according to the methods described herein. In certain examples, aspects of the operations of block 1535 may be performed by a transmit power manager as described with reference to FIGS. 7 through 9.

At block 1540 the UE 115 may identify a transient period for a PA gain adjustment. The operations of block 1540 may be performed according to the methods described herein. In certain examples, aspects of the operations of block 1540 may be performed by a PA as described with reference to FIGS. 7 through 9.

At block 1545 the UE 115 may update the PA gain value for a different calibration point during the transient period based at least in part on the first transmit power and the updated second transmit power. The operations of block 1545 may be performed according to the methods described herein. In certain examples, aspects of the operations of block 1545 may be performed by a PA as described with reference to FIGS. 7 through 9.

At block 1550 the UE 115 may transmit, during the first TTI of the reference component carrier and during the second TTI of the second component carrier, at the first transmit power for the reference component carrier and at the updated second transmit power for the second component carrier. The operations of block 1550 may be performed according to the methods described herein. In certain examples, aspects of the operations of block 1550 may be performed by a transmitter as described with reference to FIGS. 7 through 9.

Figure 16:
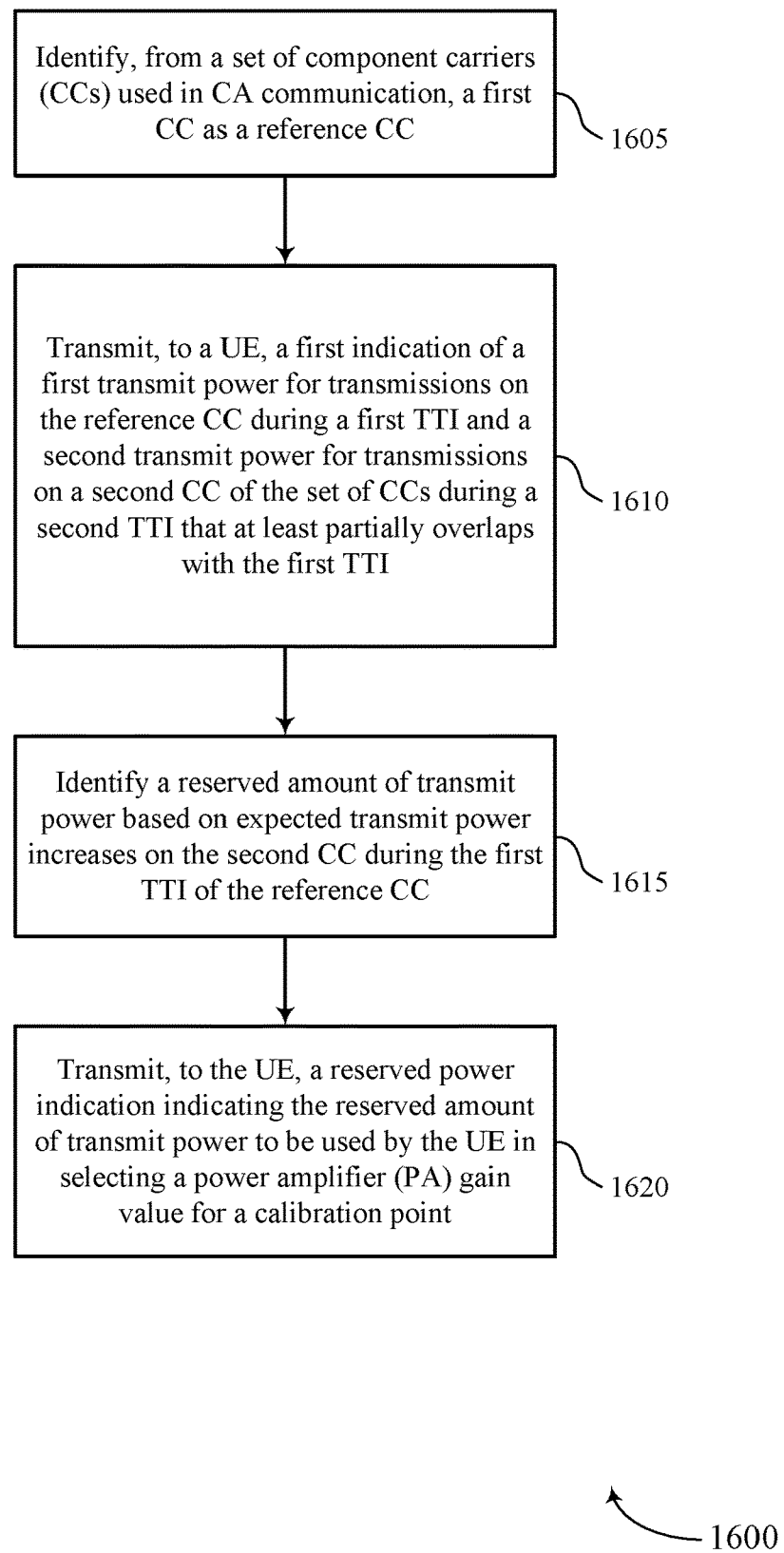

FIG. 16 shows a flowchart illustrating a method 1600 for power reservation for carrier aggregation signaling during sTTIs in accordance with various aspects of the present disclosure. The operations of method 1600 may be implemented by a base station 105 or its components as described herein. For example, the operations of method 1600 may be performed by a base station communications manager as described with reference to FIGS. 10 through 12. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may identify, from a plurality of component carriers used in carrier aggregation communication, a first component carrier as a reference component carrier. The operations of block 1605 may be performed according to the methods described herein. In certain examples, aspects of the operations of block 1605 may be performed by a carrier aggregation manager as described with reference to FIGS. 10 through 12.

At block 1610 the base station 105 may transmit, to a UE, a first indication of a first transmit power for transmissions on the reference component carrier during a first TTI and a second transmit power for transmissions on a second component carrier of the plurality of component carriers during a second TTI that at least partially overlaps with the first TTI. The operations of block 1610 may be performed according to the methods described herein. In certain examples, aspects of the operations of block 1610 may be performed by a transmit power manager as described with reference to FIGS. 10 through 12.

At block 1615 the base station 105 may identify a reserved amount of transmit power based at least in part on expected transmit power increases on the second component carrier during the first TTI of the reference component carrier. The operations of block 1615 may be performed according to the methods described herein. In certain examples, aspects of the operations of block 1615 may be performed by a power reservation manager as described with reference to FIGS. 10 through 12.

At block 1620 the base station 105 may transmit, to the UE, a reserved power indication indicating the reserved amount of transmit power to be used by the UE in selecting a PA gain value for a calibration point. The operations of block 1620 may be performed according to the methods described herein. In certain examples, aspects of the operations of block 1620 may be performed by a power reservation manager as described with reference to FIGS. 10 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying, from a plurality of component carriers (CCs) used in carrier aggregation (CA) communication, a first CC having a first transmission time interval (TTI) duration as a reference CC and a second CC having a second TTI duration different from the first TTI duration;
    determining, at a first TTI boundary of a first TTI of the reference CC, a first transmit power for the reference CC and a second transmit power for the second CC of the plurality of CCs;
    determining an amount of transmit power to be reserved during the first TTI for adjusting the second transmit power at second TTI boundaries of the second CC;
    selecting a power amplifier (PA) gain value for a calibration point based at least in part on the amount of transmit power reserved during the first TTI, the first transmit power, and the second transmit power; and
    transmitting, during the first TTI, at the first transmit power for the reference CC and at the second transmit power for the second CC, based at least in part on the amount of transmit power reserved, wherein the transmitting comprises digitally backing off from a transmit power corresponding to the PA gain value for the calibration point.

2. The method of claim 1, wherein determining the amount of transmit power to be reserved during the first TTI comprises:
    receiving, from a base station, an indication of the amount of transmit power to be reserved during the first TTI.

3. The method of claim 1, wherein determining the amount of transmit power to be reserved during the first TTI comprises:
    autonomously determining the amount of transmit power to reserve during the first TTI; and
    transmitting, to a base station, an indication of the amount of transmit power reserved during the first TTI.

4. The method of claim 3, wherein the indication is transmitted in a power headroom (PHR) report.

5. The method of claim 1, further comprising:
    identifying an updated second transmit power for the second CC during a duration of the first TTI and at a second TTI boundary of a second TTI on the second CC, the second TTI boundary being unaligned with the first TTI boundary; and
    maintaining the PA gain value for the calibration point while transmitting during the first TTI at the first transmit power for the reference CC and at the updated second transmit power for the second CC.

6. The method of claim 5, wherein maintaining the PA gain value for the calibration point comprises:
    adjusting an amount of digital back-off from the transmit power corresponding to the PA gain value for the calibration point.

7. The method of claim 1, further comprising:
    identifying an updated second transmit power for the second CC during a duration of the first TTI and at a second TTI boundary of a second TTI on the second CC, the second TTI boundary being unaligned with the first TTI boundary;
    identifying that a sum of the first transmit power and the updated second transmit power exceeds the transmit power corresponding to the PA gain value for the calibration point;
    identifying a transient period for a PA gain adjustment;

updating the PA gain value for a different calibration point during the transient period based at least in part on the first transmit power and the updated second transmit power; and transmitting, during the first TTI of the reference CC and during the second TTI of the second CC, at the first transmit power for the reference CC and at the updated second transmit power for the second CC.

8. The method of claim 7, wherein the second TTI comprises any one of one or more TTIs of the second CC that overlap with the first TTI of the first CC.

9. The method of claim 1, wherein the PA gain value for the calibration point is selected based at least in part on a sum of the amount of transmit power reserved during the first TTI, the first transmit power, and the second transmit power.

10. The method of claim 9, wherein the transmit power corresponding to the PA gain value for the calibration point is equal to or greater than the sum of the amount of transmit power reserved during the first TTI, the first transmit power, and the second transmit power.

11. The method of claim 1, wherein the amount of transmit power reserved during the first TTI is based at least in part on expected transmit power increases on the second CC during the first TTI of the reference CC.

12. The method of claim 11, further comprising:
transmitting an indication of an actual amount of power reserved for the expected transmit power increases on the second CC during the first TTI of the reference CC.

13. The method of claim 1, wherein identifying the reference CC is based at least in part on the first TTI duration being longer than the second TTI duration.

14. The method of claim 1, wherein the reference CC and the second CC are within a same frequency band.

15. The method of claim 1, wherein a same PA is used by the UE for transmissions on the reference CC and the second CC.

16. The method of claim 1, wherein the amount of transmit power reserved is equal to a power headroom (PHR) associated with transmissions on the reference CC and the second CC during the first TTI.

17. The method of claim 1, wherein the amount of transmit power reserved is less than a power headroom (PHR) associated with transmissions on the reference CC and the second CC during the first TTI.

18. A method for wireless communication, comprising:
identifying, from a plurality of component carriers (CCs) used in carrier aggregation (CA) communication, a first CC as a reference CC;
transmitting, to a user equipment (UE), a first indication of a first transmit power for transmissions on the reference CC during a first transmission time interval (TTI) and a second transmit power for transmissions on a second CC of the plurality of CCs during a second TTI that at least partially overlaps with the first TTI;
identifying a reserved amount of transmit power based at least in part on expected transmit power increases on the second CC during the first TTI of the reference CC;
transmitting, to the UE, a reserved power indication indicating the reserved amount of transmit power to be used by the UE in selecting a power amplifier (PA) gain value for a calibration point;
determining whether a total uplink transmit power for the first CC and the second CC exceeds a transmit power corresponding to the PA gain value for the calibration point; and communicating with the UE based at least in part on a result of the determining, including allocating a transient period to the UE for selecting an updated calibration point or identifying a phase discontinuity in an uplink transmission from the UE.

19. The method of claim 18, further comprising:
receiving, from the UE, a PA power indication indicating an actual amount of power reserved for the expected transmit power increases on the second CC during the first TTI of the reference CC; and
determining an updated reserved amount of transmit power for a subsequent TTI on the reference CC based at least in part on receiving the PA power indication.

20. The method of claim 19, further comprising:
identifying an updated second transmit power used for transmissions on the second CC during a third TTI that at least partially overlaps with the first TTI;
determining that the total uplink transmit power comprising a sum of the first transmit power and the updated second transmit power exceeds the transmit power corresponding to the PA gain value for the calibration point;
identifying a break in phase continuity of the transmissions on the reference CC during the first TTI based at least in part on the determination; and
demodulating the transmissions on the reference CC during the first TTI based at least in part on identifying the break in phase continuity.

21. The method of claim 18, wherein identifying the reference CC is based at least in part on the first TTI of the reference CC having a longer duration than a duration of the second TTI of the second CC.

22. The method of claim 18, wherein the reference CC and the second CC are within a same frequency band.

23. The method of claim 18, wherein the reserved amount of transmit power is equal to a power headroom (PHR) associated with transmissions on the reference CC and the second CC during the first TTI.

24. The method of claim 18, wherein the reserved amount of transmit power is less than a power headroom (PHR) associated with transmissions on the reference CC and the second CC during the first TTI.

25. A mobile device for wireless communication, comprising:
a processor;
memory coupled with the processor; and
instructions stored in the memory and operable, when executed by the processor, to cause the mobile device to:
identify, from a plurality of component carriers (CCs) used in carrier aggregation (CA) communication, a first CC having a first transmission time interval (TTI) duration as a reference CC and a second CC having a second TTI duration different from the first TTI duration;
determine, at a first TTI boundary of a first TTI of the reference CC, a first transmit power for the reference CC and a second transmit power for the second CC of the plurality of CCs;
determine an amount of transmit power to be reserved during the first TTI for adjusting the second transmit power at second TTI boundaries of the second CC;
select a power amplifier (PA) gain value for a calibration point based at least in part on the amount of transmit power reserved during the first TTI, the first transmit power, and the second transmit power; and transmit, during the first TTI, at the first transmit power for the reference CC and at the second transmit power for the second CC, based at least in part on the amount of transmit power reserved, wherein the transmitting comprises digitally backing off from a transmit power corresponding to the PA gain value for the calibration point.

26. The mobile device of claim 25, wherein the instructions are further executable by the processor to cause the mobile device to:
receive, from a base station, an indication of the amount of transmit power to be reserved during the first TTI.

27. The mobile device of claim 25, wherein the instructions are further executable by the processor to cause the mobile device to:
autonomously determine the amount of transmit power to reserve during the first TTI; and
transmit, to a base station, an indication of the amount of transmit power reserved during the first TTI.

28. The mobile device of claim 27, wherein the indication is transmitted in a power headroom (PHR) report.

29. The mobile device of claim 25, wherein the instructions are further executable by the processor to cause the mobile device to:
identify an updated second transmit power for the second CC during a duration of the first TTI and at a second TTI boundary of a second TTI on the second CC, the second TTI boundary being unaligned with the first TTI boundary; and
maintain the PA gain value for the calibration point while transmitting during the first TTI at the first transmit power for the reference CC and at the updated second transmit power for the second CC.

30. The mobile device of claim 29, wherein the instructions are further executable by the processor to cause the mobile device to:
adjust an amount of digital back-off from the transmit power corresponding to the PA gain value for the calibration point.

31. The mobile device of claim 25, wherein the instructions are further executable by the processor to cause the mobile device to:
identify an updated second transmit power for the second CC during a duration of the first TTI and at a second TTI boundary of a second TTI on the second CC, the second TTI boundary being unaligned with the first TTI boundary;
identify that a sum of the first transmit power and the updated second transmit power exceeds the transmit power corresponding to the PA gain value for the calibration point;
identify a transient period for a PA gain adjustment;
update the PA gain value for a different calibration point during the transient period based at least in part on the first transmit power and the updated second transmit power; and
transmit, during the first TTI of the reference CC and during the second TTI of the second CC, at the first transmit power for the reference CC and at the updated second transmit power for the second CC.

32. The mobile device of claim 31, wherein the second TTI comprises any one of one or more TTIs of the second CC that overlap with the first TTI of the first CC.

33. The mobile device of claim 25, wherein the PA gain value for the calibration point is selected based at least in part on a sum of the amount of transmit power reserved during the first TTI, the first transmit power, and the second transmit power.

34. The mobile device of claim 33, wherein the transmit power corresponding to the PA gain value for the calibration point is equal to or greater than the sum of the amount of transmit power reserved during the first TTI, the first transmit power, and the second transmit power.

35. The mobile device of claim 25, wherein the amount of transmit power reserved during the first TTI is based at least in part on expected transmit power increases on the second CC during the first TTI of the reference CC.

36. The mobile device of claim 35, wherein the instructions are further executable by the processor to cause the mobile device to:
transmit an indication of an actual amount of power reserved for the expected transmit power increases on the second CC during the first TTI of the reference CC.

37. The mobile device of claim 25, wherein identifying the reference CC is based at least in part on the first TTI duration being longer than the second TTI duration.

38. The mobile device of claim 25, wherein the reference CC and the second CC are within a same frequency band.

39. The mobile device of claim 25, wherein a same PA is used by the mobile device for transmissions on the reference CC and the second CC.

40. The mobile device of claim 25, wherein the amount of transmit power reserved is equal to a power headroom (PHR) associated with transmissions on the reference CC and the second CC during the first TTI.

41. The mobile device of claim 25, wherein the amount of transmit power reserved is less than a power headroom (PHR) associated with transmissions on the reference CC and the second CC during the first TTI.

42. A network device for wireless communication, comprising:
a processor;
memory coupled with the processor; and
instructions stored in the memory and operable, when executed by the processor, to cause the network device to:
identify, from a plurality of component carriers (CCs) used in carrier aggregation (CA) communication, a first CC as a reference CC;
transmit, to a user equipment (UE), a first indication of a first transmit power for transmissions on the reference CC during a first transmission time interval (TTI) and a second transmit power for transmissions on a second CC of the plurality of CCs during a second TTI that at least partially overlaps with the first TTI;
identify a reserved amount of transmit power based at least in part on expected transmit power increases on the second CC during the first TTI of the reference CC;
transmit, to the UE, a reserved power indication indicating the reserved amount of transmit power to be used by the UE in selecting a power amplifier (PA) gain value for a calibration point;
determine whether a total uplink transmit power for the first CC and the second CC exceeds a transmit power corresponding to the PA gain value for the calibration point; and
communicate with the UE based at least in part on a result of the determining, including allocating a transient period to the UE for selecting an updated calibration point or identifying a phase discontinuity in an uplink transmission from the UE.

43. The network device of claim 42, wherein the instructions are further executable by the processor to cause the network device to:
receive, from the UE, a PA power indication indicating an actual amount of power reserved for the expected transmit power increases on the second CC during the first TTI of the reference CC; and
determine an updated reserved amount of transmit power for a subsequent TTI on the reference CC based at least in part on receiving the PA power indication.

44. The network device of claim 43, wherein the instructions are further executable by the processor to cause the network device to:
identify an updated second transmit power used for transmissions on the second CC during a third TTI that at least partially overlaps with the first TTI;
determine that the total uplink transmit power comprising a sum of the first transmit power and the updated second transmit power exceeds the transmit power corresponding to the PA gain value for the calibration point;
identify a break in phase continuity of the transmissions on the reference CC during the first TTI based at least in part on the determination; and
demodulate the transmissions on the reference CC during the first TTI based at least in part on identifying the break in phase continuity.

45. The network device of claim 42, wherein identifying the reference CC is based at least in part on the first TTI of the reference CC having a longer duration than a duration of the second TTI of the second CC.

46. The network device of claim 42, wherein the reference CC and the second CC are within a same frequency band.

47. The network device of claim 42, wherein the reserved amount of transmit power is equal to a power headroom (PHR) associated with transmissions on the reference CC and the second CC during the first TTI.

48. The network device of claim 42, wherein the reserved amount of transmit power is less than a power headroom (PHR) associated with transmissions on the reference CC and the second CC during the first TTI.

49. An apparatus for wireless communication at a user equipment (UE), comprising:
means for identifying, from a plurality of component carriers (CCs) used in carrier aggregation (CA) communication, a first CC having a first transmission time interval (TTI) duration as a reference CC and a second CC having a second TTI duration different from the first TTI duration;
means for determining, at a first TTI boundary of a first TTI of the reference CC, a first transmit power for the reference CC and a second transmit power for the second CC of the plurality of CCs;
means for determining an amount of transmit power to be reserved during the first TTI for adjusting the second transmit power at second TTI boundaries of the second CC;
means for selecting a power amplifier (PA) gain value for a calibration point based at least in part on the amount of transmit power reserved during the first TTI, the first transmit power, and the second transmit power; and
means for transmitting, during the first TTI, at the first transmit power for the reference CC and at the second transmit power for the second CC, based at least in part on the amount of transmit power reserved, wherein the means for transmitting are configured for digitally backing off from a transmit power corresponding to the PA gain value for the calibration point.

50. An apparatus for wireless communication at a base station, comprising:
means for identifying, from a plurality of component carriers (CCs) used in carrier aggregation (CA) communication, a first CC as a reference CC;
means for transmitting, to a user equipment (UE), a first indication of a first transmit power for transmissions on the reference CC during a first transmission time interval (TTI) and a second transmit power for transmissions on a second CC of the plurality of CCs during a second TTI that at least partially overlaps with the first TTI;
means for identifying a reserved amount of transmit power based at least in part on expected transmit power increases on the second CC during the first TTI of the reference CC; and
means for transmitting, to the UE, a reserved power indication indicating the reserved amount of transmit power to be used by the UE in selecting a power amplifier (PA) gain value for a calibration point;
means for determining whether a total uplink transmit power for the first CC and the second CC exceeds a transmit power corresponding to the PA gain value for the calibration point; and
means for communicating with the UE based at least in part on a result of the determining, including allocating a transient period to the UE for selecting an updated calibration point or identifying a phase discontinuity in an uplink transmission from the UE.

51. A non-transitory computer readable medium storing code for wireless communication at a user equipment (UE), the code comprising instructions executable by a processor to:
identify, from a plurality of component carriers (CCs) used in carrier aggregation (CA) communication, a first CC having a first transmission time interval (TTI) duration as a reference CC and a second CC having a second TTI duration different from the first TTI duration;
determine, at a first transmission time interval (TTI) boundary of a first TTI of the reference CC, a first transmit power for the reference CC and a second transmit power for the second CC of the plurality of CCs;
determine an amount of transmit power to be reserved during the first TTI for adjusting the second transmit power at second TTI boundaries of the second CC;
select a power amplifier (PA) gain value for a calibration point based at least in part on the amount of transmit power reserved during the first TTI, the first transmit power, and the second transmit power; and
transmit, during the first TTI, at the first transmit power for the reference CC and at the second transmit power for the second CC, based at least in part on the amount of transmit power reserved, wherein the transmitting comprises digitally backing off from a transmit power corresponding to the PA gain value for the calibration point.

52. A non-transitory computer readable medium storing code for wireless communication at a base station, the code comprising instructions executable by a processor to:

identify, from a plurality of component carriers (CCs) used in carrier aggregation (CA) communication, a first CC as a reference CC;
transmit, to a user equipment (UE), a first indication of a first transmit power for transmissions on the reference CC during a first transmission time interval (TTI) and a second transmit power for transmissions on a second CC of the plurality of CCs during a second TTI that at least partially overlaps with the first TTI;
identify a reserved amount of transmit power based at least in part on expected transmit power increases on the second CC during the first TTI of the reference CC;
transmit, to the UE, a reserved power indication indicating the reserved amount of transmit power to be used by the UE in selecting a power amplifier (PA) gain value for a calibration point;
determine whether a total uplink transmit power for the first CC and the second CC exceeds a transmit power corresponding to the PA gain value for the calibration point; and
communicate with the UE based at least in part on a result of the determining, including allocating a transient period to the UE for selecting an updated calibration point or identifying a phase discontinuity in an uplink transmission from the UE.

* * * * *